(12) United States Patent
Kishore et al.

(10) Patent No.: US 9,465,653 B2
(45) Date of Patent: Oct. 11, 2016

(54) AUTOMATED INVALIDATION OF JOB OUTPUT DATA IN A JOB-PROCESSING SYSTEM

(71) Applicant: Dropbox, Inc., San Francisco, CA (US)

(72) Inventors: Shaunak Kishore, San Francisco, CA (US); Karl Dray, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 237 days.

(21) Appl. No.: 14/103,683

(22) Filed: Dec. 11, 2013

(65) Prior Publication Data

US 2015/0160969 A1      Jun. 11, 2015

(51) Int. Cl.
*G06F 9/48* (2006.01)
*G06F 11/30* (2006.01)

(52) U.S. Cl.
CPC ......... *G06F 9/4843* (2013.01); *G06F 11/3065* (2013.01)

(58) Field of Classification Search
USPC ......................................... 714/47.1; 718/106
See application file for complete search history.

(56) References Cited

U.S. PATENT DOCUMENTS

| | | | | |
|---|---|---|---|---|
| 5,347,646 | A * | 9/1994 | Hirosawa et al. | 714/49 |
| 6,401,223 | B1 * | 6/2002 | DePenning | 714/42 |
| 6,714,961 | B1 * | 3/2004 | Holmberg et al. | 718/106 |
| 7,650,331 | B1 | 1/2010 | Dean | |
| 8,108,878 | B1 * | 1/2012 | Pulsipher | G06F 9/524 |
| | | | | 718/100 |
| 8,122,453 | B2 | 2/2012 | Trossman | |
| 8,136,104 | B2 | 3/2012 | Papakipos | |
| 8,181,180 | B1 * | 5/2012 | Anderson et al. | 718/102 |
| 2003/0120708 | A1 * | 6/2003 | Pulsipher | G06F 9/4881 |
| | | | | 718/106 |
| 2003/0120709 | A1 * | 6/2003 | Pulsipher | G06F 9/4881 |
| | | | | 718/106 |
| 2003/0120710 | A1 * | 6/2003 | Pulsipher | G06F 11/0715 |
| | | | | 718/106 |
| 2004/0025163 | A1 * | 2/2004 | Babutzka | G06F 9/5038 |
| | | | | 718/106 |
| 2004/0136613 | A1 | 7/2004 | Menger | |
| 2004/0172634 | A1 | 9/2004 | Honda | |
| 2005/0015437 | A1 * | 1/2005 | Strait | H04L 67/10 |
| | | | | 709/203 |
| 2008/0189775 | A1 * | 8/2008 | Fujita | 726/7 |
| 2011/0154341 | A1 | 6/2011 | Pueyo et al. | |
| 2012/0167101 | A1 | 6/2012 | Kandula | |
| 2012/0278323 | A1 | 11/2012 | Chattopadhyay | |
| 2013/0262835 | A1 | 10/2013 | Arakawa et al. | |
| 2013/0345999 | A1 | 12/2013 | Hafen | |
| 2014/0032528 | A1 | 1/2014 | Mandre | |

(Continued)

OTHER PUBLICATIONS

Globant.com, "Azkaban overview," [online], [retrieved on Jan. 13, 2014], retrieved from the Internet: <URL:http://bigdata.globant.com/?p=441>, 3 pages.

(Continued)

*Primary Examiner* — Kamini Patel
(74) *Attorney, Agent, or Firm* — Hickman Palermo; Becker Bingham LLP

(57) ABSTRACT

A computing system can provide user interfaces and back-end operations to facilitate review and invalidation of executed jobs. The system can provide an interface that allows the operator to review quality-control information about a completed job. Once the operator identifies a job as invalid, the operator can be presented with further options, such as whether to invalidate only the reviewed job or the job and all its descendants. The operator can also review antecedent jobs to an invalid job (e.g., in order to trace the root of the problem) and can selectively invalidate antecedent jobs.

26 Claims, 16 Drawing Sheets

(56) References Cited

U.S. PATENT DOCUMENTS

2014/0282605 A1* 9/2014 Jacobson et al. ............ 718/107
2015/0160974 A1* 6/2015 Kishore et al. ............ 718/106

OTHER PUBLICATIONS

LinkedIn.com, "Azkaban," [online], [retrieved on Jan. 13, 2014], retrieved from the Internet: <URL:http://data.linkedin.com/opensource/azkaban>, 2 pages.

Qubole.com, "Apache Oozie as a Service," [online], [retrieved on Jan. 13, 2014], retrieved from the Internet: <URL:http://www.qubole.com/articles/apache-oozie-as-a-service/>, 2 pages.

"Oozie, Yahoo! Workflow Engine for Hadoop," The Apache Software Foundation, Feb. 29, 2012, [online], [retrieved on Jan. 13, 2014], retrieved from the Internet: <URL:https://oozie.apache.org/docs/3.1.3-incubating/>, 2 pages.

"Oozie Workflow Overview," The Apache Software Foundation, Feb. 29, 2012, [online], [retrieved on Jan. 13, 2014], retrieved from the Internet: <URL:https://oozie.apache.org/docs/3.1.3-incubating/DG_Overview.html, 2 pages.

"Oozie Specification, a Hadoop Workflow System," The Apache Software Foundation, Feb. 29, 2012, [online], [retrieved on Jan. 13, 2014], retrieved from the Internet: <URL:https://oozie.apache.org/docs/3.1.3-incubating/WorkflowFunctionalSpec.html>, 34 pages.

U.S. Appl. No. 14/103,671, filed Dec. 11, 2013, Office Action, Dec. 21, 2015.

* cited by examiner

LOG FILE

702 — Job ID: a36878bfceef

704 — Job Definition: //jobs/ActiveUsers28Day (start=D1, end=D28)

712 {
  Execution Start: 20130901 00:32:37
  Execution End: 20130901 11:12:54
}

714 {
  SourceObj1: Partitions processed: 6932
  SourceObj1: Rows processed: 18814537
  SourceObj2: Partitions processed: 7001
  SourceObj2: Rows processed: 19026664
  . . .
  OutputObj: Rows produced: 1880099
}

706 — Completion status: OK

FIG. 7

AUTOMATED INVALIDATION OF JOB OUTPUT DATA IN A JOB-PROCESSING SYSTEM

CROSS-REFERENCES TO RELATED APPLICATIONS

This application is related to and incorporates by reference for all purposes the full disclosure of co-pending U.S. patent application Ser. No. 14/103,671, filed Dec. 11, 2013, entitled "Job-Processing Systems and Methods with Inferred Dependencies Between Jobs".

BACKGROUND

The present disclosure relates generally to job-processing computer systems and in particular to fully or partially automated invalidation of job output data in such a system.

Large-scale data analysis can help businesses achieve various goals. For example, online services continue to proliferate, including social networking services, online content management services, file-sharing services, and the like. Many of these services are supported by large-scale computing systems including server farms, network storage systems and the like. Making sure the resources are matched to current and future user demand is an important part of efficiently managing an online service, and analysis of large quantities of data can help the service provider understand and anticipate trends in demand. As another example, sales or advertising businesses may amass customer data such as who visits which websites, for how long, and whether or what they purchase. Making use of this data, e.g., to develop or revise a marketing strategy, requires processing large quantities of data.

Analytics systems have emerged as a tool to help businesses analyze large quantities of data. Such systems can provide automated processes for generating reports that provide various windows into customer behavior. For instance, in a typical online-service environment, collected data (such as user activity logs) can be stored in a data warehouse. The collected data can be processed using distributed computing techniques to generate reports that can be delivered to executives, system managers, and/or others within the online-service provider's organization. These reports can guide decision processes, such as adding new capacity or developing or enhancing service offerings.

Analytics systems depend on data and data availability. Data for reports can come from "raw" data, such as logs of user activity, or previously processed data and can be processed through a series of processing jobs defined by an operator of the analytics system (also referred to as an "analyst"). For instance, a report on system usage patterns may be created by running a first job to process a log of user activity to identify all user identifiers that logged in at least once in a 24-hour period, then running a second job to group the user identifiers according to some metric of interest (e.g., demographics, geographic location, etc.). Such a report would depend on availability of user login and logout data (the activity log). If the login/logout data is not available, the report can be delayed, be incorrect or fail to be created.

SUMMARY

In a data-processing environment where jobs depend on data generated by other jobs, it is possible for errors or incorrect data to enter the system. For example, some or all of the input data needed by a first job may be missing, or the input data may be incorrect or unreliable due to errors in an earlier job that produced the input data. In some instances, such errors are not detected until after the first job has executed, and in the meantime, an error in the first job can easily propagate into subsequent jobs that consume data from the first job. Thus, it can be desirable to provide the ability for the data-processing system or operators of the system to identify and invalidate jobs where errors occurred. As used herein, invalidating a job can include establishing any indication within the data-processing system that the output data produced by that job is unreliable, or "invalid." For example, in some embodiments, invalidating a job can include adding to a log file or other record of job execution indicia indicating that the job completed but produced invalid data; adding indicia of invalidity to an output data object produced by the job or a metadata structure associated with the job. Invalidation of one job can cause subsequent jobs that consume the output data produced by the job to suspend (or not start) execution, to set various flags or other indicia to indicate potential invalidity, or the like.

Certain embodiments of the present invention relate to systems and methods for invalidating data produced by jobs executed in a computing system such as an analytics system. In some embodiments, the system can provide user interfaces and back-end operations to facilitate invalidation of jobs.

For example, in some embodiments, statistical analysis can be used to detect jobs that produced anomalous results and flag such jobs for operator review. In some embodiments, operators can select jobs to review (either from a list of jobs with anomalous results or a list of all jobs), and the system can provide an interface that allows the operator to review quality-control information about the job, which can include statistical information such as the amount of data consumed and/or produced, execution time, and so on. Once the operator identifies a job under review as invalid, the operator can be presented with further options, such as whether to invalidate only the reviewed job or the reviewed job and all its descendants (i.e., jobs that consumed, directly or indirectly, output data produced by the invalid job).

Further, as noted above, a job can be invalid because it received invalid source data. Accordingly, when a job is identified as invalid, the operator may want to examine antecedent jobs (i.e., jobs whose output data was consumed, directly or indirectly, by the identified invalid job) in order to trace the root of the problem. Certain embodiments facilitate such analysis, e.g., by providing an interface that identifies the antecedent jobs to an invalid "base" job and allows the operator to review the antecedent jobs in a systematic manner until the root of the problematic data is identified. Thus, the operator can track problem data to its ultimate root or source. As part of the analysis process, the interface can facilitate selective invalidation of antecedent jobs and their descendants, as well as the base job and its descendants.

Certain embodiments relate to computer-implemented methods for invalidating jobs. For example, a monitoring interface of an analytics system can identify a base job to be invalidated. The base job can be, e.g., any job that has been executed by the analytics system and can be identified on the basis of anomalous results (e.g., statistical anomalies in the size of a data object produced, amount of data consumed, job execution time, etc.). Given a base job, the monitoring interface can identify a set of antecedent jobs for the base job; this set can include any job that produced a data object that was consumed directly or indirectly by the base job and in some instances can include every such job. The monitoring interface can identify, e.g., through a sequence of user interactions, a subset of the set of antecedent jobs that is to be invalidated. Once all jobs to be invalidated are identified, the monitoring interface can perform the invalidations, e.g., by updating an execution record of the job or a metadata field associated with an output data object of the job to indicate invalidity.

Certain embodiments relate to computer systems that can execute and invalidate jobs. Such systems can include a distributed computing subsystem that executes the jobs, a workflow manager that schedules the jobs for execution, and a monitoring module. The monitoring module can identify and invalidate a base job and a selected subset of antecedent jobs of the base job. The monitoring module can also identify and invalidate a set of descendant jobs; this set can include any job that directly or indirectly consumed an output data object that was produced by the base job or by one of the invalid antecedent jobs. In some embodiments, the monitoring module can interact via a user interface, allowing a user to control the invalidation. For example, prior to invalidating any jobs, the monitoring module can present a list of proposed jobs to invalidate and receive a user instruction indicating which of the proposed jobs should be invalidated. In some embodiments, the monitoring module can communicate with the workflow manager to reschedule invalidated jobs; rescheduling can also be based on user input.

In some embodiments, the monitoring module can interact with a user to facilitate identifying the base job. For instance, some embodiments of a monitoring module can analyze quality-control data for executed jobs to identify one or more suspect jobs (i.e., any job whose output data is suspect according to some quality-control metric). The monitoring module can present a listing of the suspect jobs to the user, and the user can select one of the suspect jobs for review. Once a job is selected, the monitoring module can present quality-control data for that job (e.g., in graphical form), and the user can review the data and indicate whether the job should be invalidated. If so, then the job can be treated as a "base" job and used to identify antecedent and/or descendant jobs that should also be invalidated.

The following detailed description together with accompanying drawings, will provide a better understanding of the nature and advantages of the present invention.

BRIEF DESCRIPTION OF THE DRAWINGS

FIG. 7 shows a log file that can be generated by a job according to an embodiment of the present invention.

DETAILED DESCRIPTION

Certain embodiments of the present invention relate to systems and methods for invalidating data produced by jobs executed in a computing system such as an analytics system. In some embodiments, the system can provide user interfaces and back-end operations to facilitate invalidation of jobs.

For example, in some embodiments, statistical analysis can be used to detect jobs that produced anomalous results and flag such jobs for operator review. In some embodiments, operators can select jobs to review (either from a list of jobs with anomalous results or a list of all jobs), and the system can provide an interface that allows the operator to review statistical information about the job, such as amount of data consumed and/or produced, execution time, and so on. Once the operator identifies a job under review as invalid, the operator can be presented with further options, such as whether to invalidate only the reviewed job or the reviewed job and all its descendants (i.e., jobs that consumed, directly or indirectly, output data produced by the invalid job).

Further, as noted above, a job can be invalid because it received invalid source data. Accordingly, when a job is identified as invalid, the operator may want to examine antecedent jobs (i.e., jobs whose output data was consumed, directly or indirectly, by the identified invalid job) in order to trace the root of the problem. Certain embodiments facilitate such analysis, e.g., by providing an interface that identifies the antecedent jobs to an invalid "base" job and allows the operator to review the antecedent jobs in a systematic manner until the root of the problematic data is identified. Thus, the operator can track problem data to its ultimate root or source. As part of the analysis process, the interface can facilitate selective invalidation of antecedent jobs and their descendants, as well as the base job and its descendants.

Figure 1:
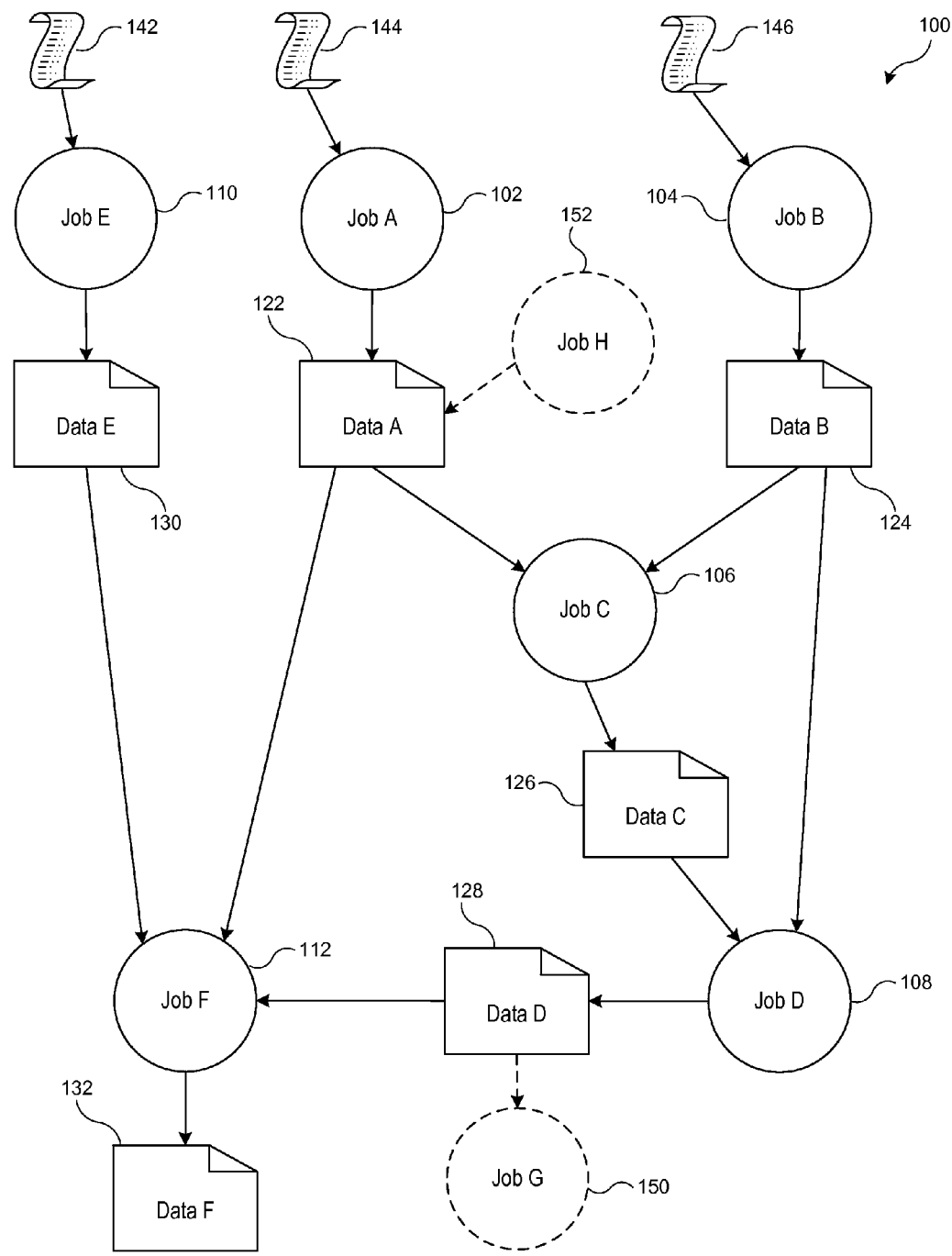
FIG. 1 shows an example of dependency definitions according to an embodiment of the present invention.

FIG. 1 shows an example of dependency definitions according to an embodiment of the present invention. As shown, an analytics system may execute a number of jobs, including job A 102, job B 104, job C 106, job D 108, job E 110, and job F 112. A "job" as used herein can include any defined and scheduled processing task that performs an operation (or a sequence of operations) on source data to produce output data. In the example shown, each job produces a corresponding output data object: job A 102 produces data A 122; job B 104 produces data B 124; job C 106 produces data C 126; job D 108 produces data D 128; job E 110 produces data E 130; and job F 112 produces data F 132. Although not shown in FIG. 1, in some instances, a single job can produce multiple data objects.

Data consumed and/or produced by the various jobs can include any type of data or information available to or within an analytics system. For instance, jobs A 102, B 104 and E 110 can be jobs that operate on "raw" input data such as user activity logs 142, 144, 146. Jobs A 102, B 104, and E 110 can perform different operations on the same input data or the same operations on different input data or different operations on different input data as desired. Job C 106 consumes data A 122 that is produced by job A 102 and data B 124 that is produced by job B 104. Data C 126 is produced by job C 106 and consumed by job D 108. Thus, job C 106 is a "sink" job (or consumer) in relation to jobs A 102 and B 104 but a "source" job (or producer) in relation to job D 108.

The output data from different jobs can be in different formats. For example, in one embodiment, job A 102 can produce a database table that includes selected information from the log, such as a deduplicated list of all user identifiers appearing in the log; data A 122 can represent the database table. In the same embodiment, job F 112 can process the user list of data A 122 together with additional inputs and produce a user-readable report as data F 132.

As shown in FIG. 1, multiple jobs can consume the same source data. For example, data A 122 is consumed by job C 106 and by job F 112. Likewise, a single job can be a sink for one or more data sources. For example, job D 108 has one data source, data C 126. Job C 106 has two data sources, data A 122 and data B 124. Job F 112 has three data sources, data A 122, data D 128, and data E 130. Thus, one source job can produce data for any number of sink jobs, and a job can be a sink job for any number of data sources.

For purposes of correctly executing all of the jobs in FIG. 1, a scheduling system can be used to make sure that jobs are executed in the correct order, which can be any order subject to the condition that a job that produces a data object completes execution (or at least completes production of the data object) before any job that consumes that data object begins execution (or at least begins consumption of the data object). Thus, for example, a scheduling system can require that jobs A 102 and B 104 be completed before job C 106 begins. Jobs A 102 and B 104 can execute in any order, or concurrently, since neither depends on data generated by the other. In some systems, e.g., as described below, the scheduling system can identify jobs that are ready to execute and can dispatch the jobs to a computing cluster for execution. Upon completion of a job, the computing cluster can inform the scheduling system, which can then determine which job (or jobs) to dispatch next.

In some embodiments, defining a job to be executed by an analytics system can include specifying a name for each data object to be produced by the job and the name of each data object to be consumed by the job. Thus, for example, an analyst defining job C 106 can specify that job C 106 consumes data A 122 and data B 124 and produces data C 126. From this information, the analytics system can infer that the jobs that produce data A 122 and data B 124 should execute before job C 106. Further, because the definition of job A 102 specifies that job A produces data A 122 and the definition of job B 104 specifies that job B produces data 124, the analytics system can determine that the jobs that should execute before job C 106 are jobs A 102 and B 104.

Where the analytics system infers dependencies among jobs from the data dependencies, the analyst can define a job that consumes data and have it correctly inserted into the dependency structure without having to determine which job (or jobs) generate the data that is to be consumed. For example, an analyst might define job G 150 (dashed lines) as a new job that consumes data D 128; as long as the analyst knows that data D 128 is being created, the analyst does not need to know that job D 108 is the creator, or what dependencies job D 108 has on any other jobs.

Further, if the source job (or jobs) for a particular data object are redefined, the dependency structure can be updated without altering the definitions of downstream jobs. For example, an analyst might define job H 152 (dashed lines) as a new job that produces additional data that becomes part of data A 122 (a specific example is given below). The definitions of consumer jobs C 106 and F 112 need not be affected, as they continue to consume data A 122, regardless of the source of the data.

In accordance with certain embodiments of the present invention, job dependency information can be used to facilitate invalidation of jobs. As used herein, an "invalid job" is a job that, at some point after execution, is identified as having produced invalid output data. Output data from a job can be identified as invalid based on some set of criteria for credibility, which can be defined as desired. For example, in some cases (e.g., where jobs are executed on a recurring basis), significant deviation of output data from expected patterns can be an indicator that the data is not credible. As another example, output data might not be credible if it was produced using a computer system that had a known problem (e.g., network service interruptions during execution of the job). As still another example, output data might not be credible if it was produced from input data that has been identified as invalid.

Where one job is identified as invalid, the dependency information pertaining to that job can be used to identify other jobs to be invalidated. For instance, if data C 126 is identified as invalid, then job C 106 can be invalidated. Further, jobs D 108 and F 112, which directly or indirectly consume data C 126, can also be invalidated as "descendants" of job C 106. Further still, in some embodiments, identification of job C 106 as invalid can be used to trigger an analysis of antecedent jobs (jobs A 102 and B 104 in this example) to determine whether they should also be invalidated. Examples of systems and methods that can facilitate invalidation of jobs are described below.

It will be appreciated that the dependency structure of FIG. 1 is illustrative and that variations and modifications are possible. A processing job can be defined as desired and can include any number, type, and combination of data-processing operations. For example, a processing job may perform database operations such as creating a data table in a database from a structured input file (e.g., an event log), querying a database or data table, performing database operations on data tables (e.g., merge, join, deduplicate), performing arithmetic or statistical computations (e.g., sum, difference, average, median, standard deviation, correlations), and so on. A job can produce one or more output data objects and can consume one or more input data objects, and a given job can depend on or be depended on by any number of other jobs. In some systems, dozens or hundreds of discrete jobs can be defined, with some jobs depending on earlier jobs that in turn depend on still earlier jobs. Detection of any invalid data object can result in invalidating the "base" job that produced the invalid data object, descendant jobs that consumed the invalid data object, and/or antecedent jobs that produced invalid data objects consumed by the base job.

Figure 2:
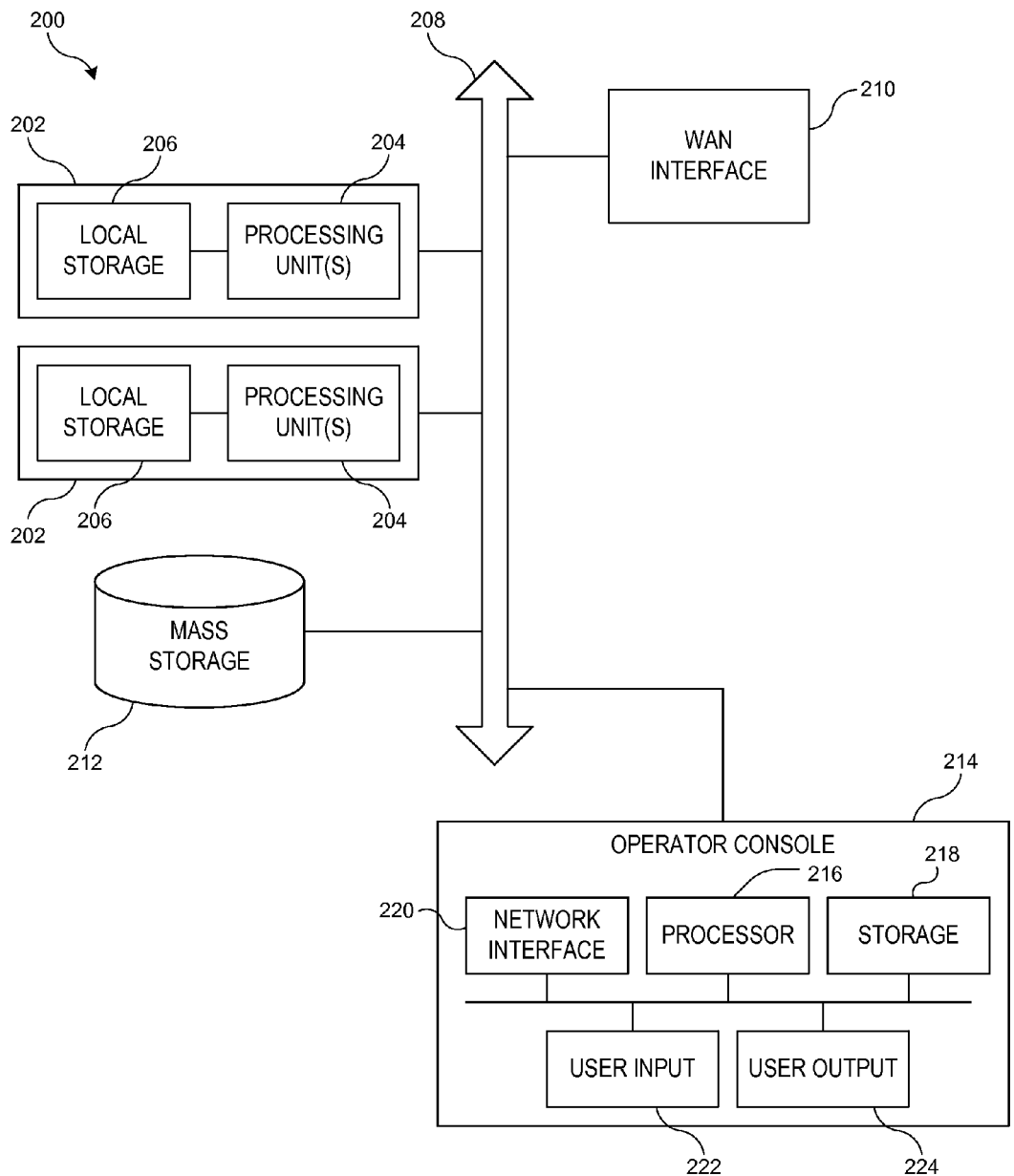
FIG. 2 shows a server system that can be used to implement aspects of an analytics system in a distributed-computing architecture according to an embodiment of the present invention.

Job-execution systems (including systems for reviewing the results of job execution) can be implemented in a variety of standalone computer systems and/or distributed-computing architectures. FIG. 2 shows a server system 200 that can be used to implement an analytics system (or aspects thereof) in a distributed-computing architecture according to an embodiment of the present invention.

Server system 200 can have a modular design that incorporates a number of modules 202 (e.g., blades in a blade server implementation); while two modules 202 are shown, any number can be provided. Each module 202 can include processing unit(s) 204 and local storage 206.

Processing unit(s) 204 can include a single processor, which can have one or more cores, or multiple processors. In some embodiments, processing unit(s) 204 can include a general-purpose primary processor as well as one or more special-purpose co-processors such as graphics processors, digital signal processors, or the like. In some embodiments, some or all processing units 304 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 204 can execute instructions stored in local storage 206. Any type of processors in any combination can be included in processing unit(s) 204.

Local storage 206 can include volatile storage media (e.g., conventional DRAM, SRAM, SDRAM, or the like) and/or non-volatile storage media (e.g., magnetic or optical disk, flash memory, or the like). Storage media incorporated in local storage 206 can be fixed, removable or upgradeable as desired. Local storage 206 can be physically or logically divided into various subunits such as a system memory, a read-only memory (ROM), and a permanent storage device. System memory can include a read-and-write memory device, e.g., a volatile read-and-write memory, such as dynamic random access memory, and can store some or all of the instructions and data that processing unit(s) 204 need at runtime. ROM can store static data and instructions that are needed by processing unit(s) 206. Permanent storage devices can include a non-volatile read-and-write memory device, e.g., flash memory or magnetic disk, and can store instructions and data even when module 202 is powered down. The term "storage medium" as used herein includes any medium in which data can be stored indefinitely (subject to overwriting, electrical disturbance, power loss, or the like) and does not include carrier waves and transitory electronic signals passing wirelessly or over wired connections.

In some embodiments, local storage 206 can store one or more software programs to be executed by processing unit(s) 204, such as an operating system and/or programs implementing various functions, such as execution of all or part of a processing job or other processes as described herein. "Software" refers generally to sequences of instructions that, when executed by processing unit(s) 204 cause server system 200 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 204. Software can be implemented as a single program or a collection of separate programs or program modules that interact as desired. From local storage 206 (or non-local storage described below), processing unit(s) 204 can retrieve program instructions to execute and data to process in order to execute various operations described herein.

In some server systems 200, multiple modules 202 can be interconnected via a bus 208, forming a local area network that supports communication between modules 202 and other components of server system 200. Bus 208 can be implemented using various technologies including server racks, hubs, routers, etc.

A wide area network (WAN) interface 210 can provide data communication capability between the local area network (bus 208) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 206 is intended to provide working memory for processing unit(s) 204, providing fast access to programs and/or data to be processed while reducing traffic on bus 208. Storage for larger quantities of data can be provided on the local area network by one or more mass storage subsystems 212 that can be connected to bus 208. Mass storage subsystem 212 can be based on magnetic, optical, semiconductor, or other data storage technologies. Direct attached storage, storage area networks, network-attached storage, and the like can be used. Any data stores or other collections of data described herein as being produced or consumed by servers can be stored in mass storage subsystem 212. In some embodiments, additional data storage resources may be accessible via WAN interface 210 (potentially with somewhat increased latency). Mass storage subsystem 212 can be used to store user activity logs, one or more databases that can include various data tables, and/or other large data objects, examples of which are described below.

In some embodiments, server system 200 can operate in response to requests received via WAN interface 210. For example, one of modules 202 can implement a supervisory function and assign discrete tasks to other modules 202 in response to received requests. Conventional work allocation techniques can be used. As requests are processed, results can be returned to the requester via WAN interface 210. Such operation can generally be automated. Further, in some embodiments, WAN interface 210 can connect multiple server systems 200 to each other, providing scalable solutions capable of managing high volumes of activity. Thus, a distributed computing architecture can be distributed across any number of physical computer systems without geographic constraint. Conventional or other techniques for managing server systems and server farms (collections of server systems that cooperate) can be used, including dynamic resource allocation and reallocation.

In some embodiments, operator console 214 can be provided to allow a system operator or administrator to interact directly with server system 200, e.g., for purposes of monitoring, testing, troubleshooting, upgrading, or the like, as well as for purposes of allowing analysts to define jobs and/or update job definitions. Operator console 214 can include conventional computer components such as a processor 216, storage device 218, network interface 220, user input device 222, and user output device 224. In some embodiments, operator console 214 can be physically remote from the rest of server system 200 and can be connected via WAN interface 210.

Processor 216 and storage device 218 can be similar to processing unit(s) 204 and local storage 206 described above. Suitable devices can be selected based on the demands to be placed on operator console 214; for example, console 214 can be implemented as a "thin" client with limited processing capability. Network interface 220 can provide a connection to bus 208 and/or directly to a WAN. User input device 222 can include any device (or devices) via which a user can provide signals to console 214; console 214 can interpret the signals as indicative of particular user requests or information. In various embodiments, user input device 222 can include any or all of a keyboard, touch pad, touch screen, mouse or other pointing device, scroll wheel, click wheel, dial, button, switch, keypad, microphone, and so on.

User output device 224 can include any device via which console 214 can provide information to a user. For example, user output device 224 can include a display to display images generated by or delivered to console 214. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 224 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 204 can provide various functionality for server system 200, including any of the functionality described herein as being performed by a server, analytics system, or distributed processing system.

It will be appreciated that server system 200 is illustrative and that variations and modifications are possible. Server system 200 can have other capabilities not specifically described here. Further, while server system 200 is described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 3:
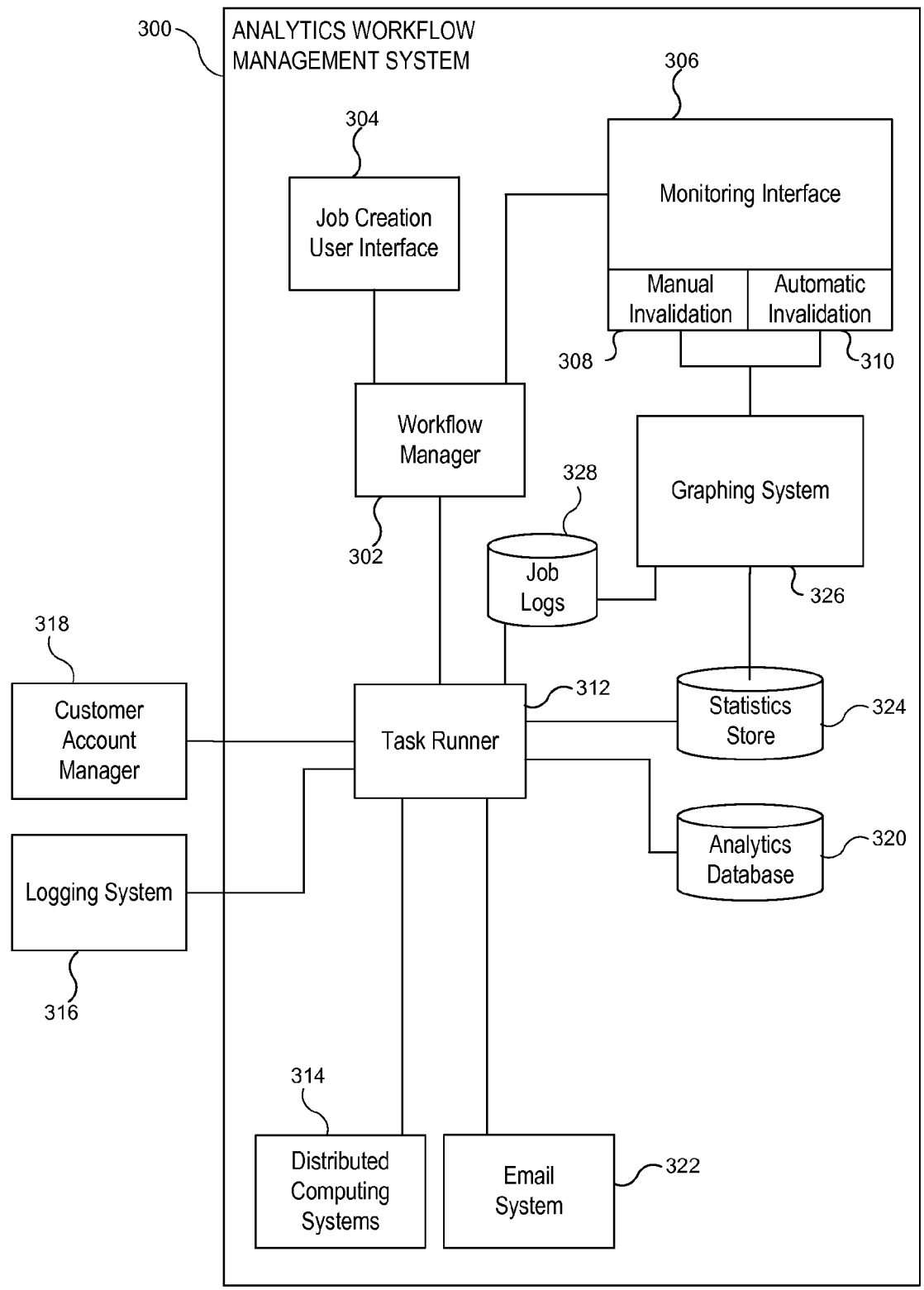
FIG. 3 shows a simplified block diagram of an analytics workflow management system according to an embodiment of the present invention.

In some embodiments, system 200 can implement an analytics workflow management system that can schedule and execute jobs and that can also manage review and validation or invalidation of executed jobs. FIG. 3 shows a simplified block diagram of an analytics workflow management system 300 according to an embodiment of the present invention. System 300 can include various functional blocks or modules that can be implemented, e.g., using software (program code) executing on suitably configured processors, including workflow manager 302, job creation user interface 304, monitoring module 306, task runner 312, distributed computing systems 314, logging system 316, customer account management module 318, email system 322, and graphing system 326. System 300 can also include or have access to various data stores including an analytics database 320, a statistics data store 324, and job logs data store 328.

Job creation user interface 304 can provide a graphical user interface, command-line user interface, or other user interface via which an analyst (i.e., a user authorized to access analytics system 300) can define jobs to be executed using system 300. For instance, the analyst can provide a definition that includes a job name, program code specifying the processing to be performed, and identification of one or more data tables (or other data objects) to be produced by the job and/or one or more data tables (or other data objects) to be consumed by the job. In some embodiments, job creation user interface 304 can be implemented on operator console 214 of FIG. 2. There can be multiple instances of job creation user interface 304, and any number of analysts can access the system concurrently.

Workflow manager 302 can coordinate scheduling of jobs. For example, workflow manager 302 can receive job definitions via job creation user interface 304 and can determine when to schedule jobs, e.g., by inferring dependencies between jobs from the data tables (or other data objects) identified as being produced and consumed by various jobs. Examples of job scheduling processes that can be implemented in workflow manager 302 are described below.

Task runner 312 can coordinate execution of the jobs by distributed computing systems 314. For example, when workflow manager 302 determines that a job is ready for execution, workflow manager 302 can dispatch the job, e.g., by delivering a descriptor for the job to task runner 312. Task runner 312 can identify specific computing resources within distributed computing systems 314 that are available for use and that have the requisite capabilities to execute the job, and can instruct those resources to execute the job. Once jobs are completed, task runner 312 can report the completion status to workflow manager 302.

Distributed computing systems 314 can include any type of distributed computing system, such as systems can include systems implementing Hadoop™ distributed-application software and Hive™ data warehouse infrastructure (products of Apache Software Foundation). Other systems and software can also be used. In operation, distributed computing systems 314 can execute instances of jobs, e.g., processing source data from database 320 and/or statistics store 324 and writing output data to database 320 and/or statistics store 324. In some embodiments, distributed computing systems 314 can also access external systems during processing. For example, distributed computing systems 314 can obtain user information, event logs, and/or other raw data from customer account management system 318, logging systems 316, and/or other systems associated with an underlying system or service whose use or behavior to be analyzed using system 300. In some embodiments, task runner 312 can mediate access by distributed computing systems 314 to these external resources (as shown in FIG. 3); in other embodiments, distributed computing system 314 or portions thereof can access these resources directly. In other instances, distributed computing systems 314 can perform operations on data stored in analytics database 320 and/or statistics store 324. Upon completion of a job, distributed computing systems 314 can notify task runner 312.

In some embodiments, task runner 312 can also interact with other systems, e.g., to send reports generated by a job to analysts or other designated recipients. For example, some processing jobs can include emailing a report to selected email addresses, and task runner 312 can provide the report to email system 322 for dissemination after the report has been generated using distributed computing systems 314.

Job logs data store 328 can store information about jobs that have been (or are being) executed. For example, a job log file can be generated for each job as it executed. Once execution of a job has completed, its log file can be stored in data store 328, where it can remain until it is no longer of interest. In some embodiments, job log files can be preserved indefinitely; in other embodiments, job log files can be subject to periodic purges (e.g., after 30 days, 90 days, one year, or the like). As described below, job log files can include information usable to detect invalid data.

Monitoring interface 306 can receive information from workflow manager 302 regarding the execution and/or completion of jobs. In some embodiments, monitoring interface 306 can present a graphical user interface (e.g., via operator console 214 of FIG. 2) to allow analysts, system administrators, or other operators of system 300 to review the performance of the system. Monitoring interface 306 can also provide notification or alerting services, e.g., by emailing or texting designated operators if certain events occur (e.g., various error conditions or system crashes).

In some embodiments, monitoring interface 306 can also perform invalidation of data generated by various jobs. Invalidation can be performed automatically or through operator interaction with monitoring interface 306. For example, monitoring interface 306 can facilitate operator review of executed jobs and identification of jobs to be invalidated (e.g., by using dependency information pertaining to the jobs); examples are described below.

Graphing system 326 can operate in conjunction with monitoring system 306. For example, graphing system 326 can perform analysis on data generated by various jobs to detect and flag likely errors (e.g., if no data is generated by a job where a non-null result is expected or if the data deviates significantly from expectations). In some embodiments, monitoring interface 306 can provide manual invalidation (module 308) based on user instructions and/or automatic invalidation (module 310) based on analysis by graphing system 326.

Analytics system 300 can be used to manage and execute any number of jobs or workflows (a workflow can include multiple jobs with dependencies, and multiple independent or interlinked workflows can be concurrently defined). An analyst can interact with job creation user interface 304 to define one or more jobs to be executed. Defining a job can include identifying a data table (or other data object) that the job produces and identifying one or more data tables (or other data objects) that are used as inputs to the job. In some embodiments, defining a job can also include providing other information, such as a due date/time by which the job should be completed, a start date/time at which execution of the job should begin, and/or an estimated execution time indicating how long the job is expected to take to execute.

Based on job definitions provide by the analyst(s), workflow manager 302 can schedule jobs for execution by task runner 312. In scheduling jobs, workflow manager 302 can infer dependencies between jobs and a corresponding execution order for dependent jobs based on the analyst's specifications of data objects produced and consumed by various jobs.

In addition, workflow manager 302 can also determine start times for various jobs, based on the inferred dependencies as well as any start dates, due dates, and execution times provided by the analyst(s). For example, referring to FIG. 1, suppose that an analyst specifies that job F 112 should be completed by Monday at 8 a.m. (a due date/time). Using execution times for various jobs and the job-to-job dependencies inferred from FIG. 1, workflow manager 302 can work backward. For instance, if job F 112 requires ten hours to complete, then job F should start no later than 10 p.m. on Sunday. This in turn implies that jobs A 102, E 110, and D 108 need to be completed no later than 10 p.m. on Sunday. Similarly, based on the execution time of job D 108, workflow manager 302 can infer a start time for job C 106 and for jobs B 104 and A 102, which source data for job C 106. (In this example, the critical path for job A 102 is likely to be as a data source for job C, and the start time for job A 102 would be determined accordingly.)

In scheduling jobs, workflow manager 302 can make use of estimated execution times. An estimated execution time can be provided by an analyst, e.g., when defining a new job, and/or determined by workflow manager 302 (or monitoring interface 306), e.g., based on previous executions of the same job or similar jobs. In some embodiments, an initial estimate provided by the analyst can be refined over time based on actual execution of the job.

In some embodiments, workflow management system 300 can store data output from prior jobs in database 320 and/or statistics store 324 for use in subsequent jobs to save repeating portions of processing work. Where prior results can be stored, jobs can be dynamically redefined to leverage stored results. For example, data tables regarding user activity in a week can be generated on a weekly basis, and data tables from different weeks can be combined to provide data regarding longer time periods such as a month, quarter, half-year, or year.

It will be appreciated that system 300 is illustrative and that variations and modifications are possible. For instance, system 300 or portions thereof can be implemented using server architecture 200 of FIG. 2 or different architectures as desired. Distributed computing systems 314 that coordinate activity across multiple processors are currently a practical solution for processing large quantities of data (e.g., millions of records) in a reasonable time frame (e.g., hours rather than weeks); those skilled in the art will recognize that job-processing system implementations can be scaled (anywhere from a single processor up to any larger number of processors) based on capabilities of available processors and/or volume of data to be processed.

In some embodiments, in addition to specifying that a job depends on a particular data table (or other data structure), the analyst can classify the dependency into one of a set of defined dependency types. For example, some embodiments provide analytics related to use of an online service, and various metrics are computed relative to some time period of interest. In such embodiments, it can be useful to classify dependencies as "snapshot" or "interval" types based on the timeframe represented by the data object in question.

Figure 4:
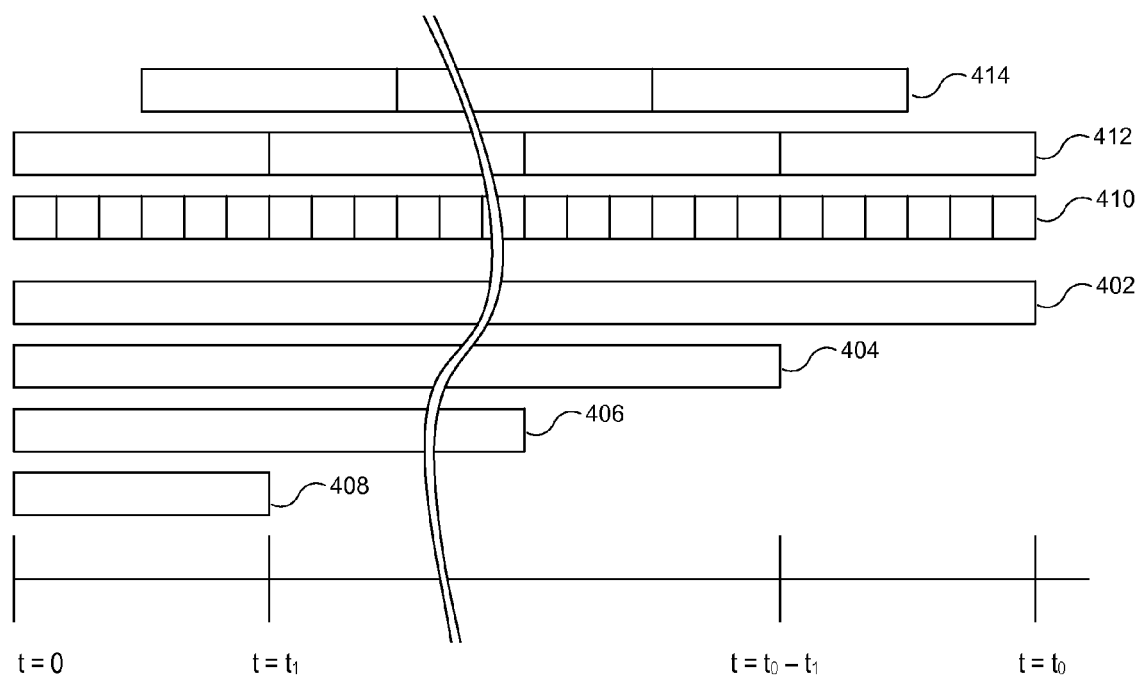
FIG. 4 shows a timeline view illustrating snapshots and intervals according to an embodiment of the present invention.

FIG. 4 shows a timeline view illustrating snapshots and intervals according to an embodiment of the present invention. Shown as bar 402 is a time interval covered by a "snapshot" for a time $t_0$. As used herein, a "snapshot" data object reflects a cumulative state of its data from the "beginning of time" (shown as t=0, which can be, e.g., inception date of an online service) up to a cutoff time (e.g., today or last Tuesday at noon). Snapshots can be taken at different times, examples of which are represented as bars 404, 406, 408. Each snapshot starts at the same time (t=0), but they have different cutoff times. As a result, different snapshot data objects produced from the same source data can contain different, possibly overlapping information.

By way of specific illustration, a list of all registered users of an online service as of a specific cutoff time can be generated as a snapshot data object. The list can include all users who registered at any time prior to the cutoff time and did not unregister prior to the cutoff time. Thus, for example, bars 408, 406, 404, and 402 can represent time periods covered by user lists generated at different times. If user X registers with the service before time $t_1$ and never unregisters, user X will appear in all four snapshots of the user list. If user Y registers at a time after $t_1$ and before $2t_1$, then unregisters at a time after time $(t_0-t_1)$ and before $t_0$, user Y will appear only in snapshots for times 404 and 406.

In contrast to snapshots, bars 410, 412, 414 represent series of "interval" data objects. As used herein, an "interval" data object reflects activity between a (variable) starting time and an ending time. Intervals can have different durations. For example, bar 410 represents intervals of duration $t_1/6$, while bars 412 and 414 represent intervals of duration $t_1$. Start time and end time can be chosen as desired; for example, bars 412 and 414 represent intervals of the same duration but different start (and therefore end) times.

By way of specific illustration, a list of all user identifiers that were used to interact with an online service during a specific time period (e.g., one day, one week, one month) can be generated as an interval data object. A particular user identifier will appear in the list for intervals during which the user interacted with the service and will not appear in other lists.

In accordance with some embodiments of the present invention, a job that generates data can be classified as either a snapshot job or an interval job, depending on whether a snapshot or interval data object is to be generated. Further, job execution can be optimized based on the job definition and other jobs that may have already generated data objects. For example, a job may be defined to execute once per day to generate a snapshot of data regarding registered users of an online service (e.g., a list of user identifiers and/or other data such as each user's geographic location). Rather than reading the entire user database, which may contain millions of user records, on a daily basis, the job can start with the previous snapshot and replay any changes to the user database since the last day, e.g., based on a log of user-database updates. Thus, the job can copy the previous snapshot data object (assuming it is desirable to retain previous snapshots) and use the update log to add any newly registered users, and remove any users who unregistered, thereby generating a new snapshot data object. As another example, a "daily" job may be defined to execute once per day to generate a data table of all users who interacted with an online service at least once during the preceding day, and a weekly job may be defined to execute once per day to generate a data table of all users who interacted with an online service at least once during the preceding week (seven days). The daily job can include reading a daily activity log produced by the online service to extract the user identifiers into the data table and deduplicating the table, and the weekly job can execute by merging the data tables generated by seven instances of the daily job rather than by directly reading the activity logs.

Any given job can consume snapshot data objects, interval data objects, or a combination thereof. Similarly, a job can produce snapshot data objects or interval data objects, regardless of which type of data it consumes. The terms "snapshot job" and "interval job" are used herein to refer, respectively to a job that produces snapshot data and a job that produces interval data.

Figure 5:
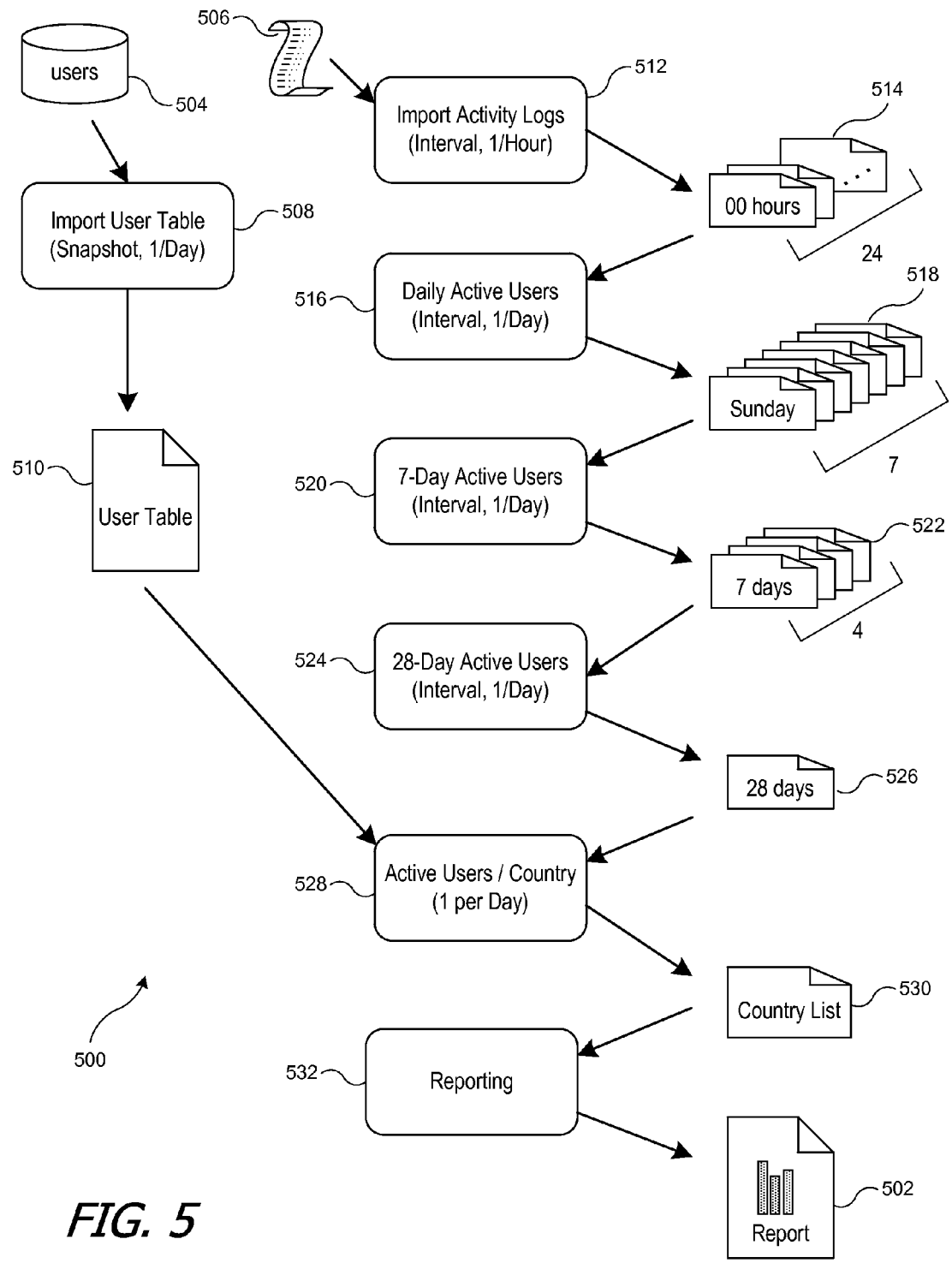
FIG. 5 shows a workflow that can be defined and executed in an analytics system according to an embodiment of the present invention.

For a specific example of use of analytics workflow management system 300, reference is now made to FIG. 5, which shows a workflow 500 that can be defined and executed using system 300 (or other systems) according to an embodiment of the present invention. Workflow 500 produces a report 502 summarizing information about active users of an online service per country over a 28-day period. Report 502 can be produced in any format desired (e.g., text, graphics, etc.) and can include, e.g., the number or percentage of active users who hail from each country.

To produce this information, workflow 500 relies on information about the active users of the online service, such as a user identifier and country of each active user. Portions of this information can be extracted from a user database 504 maintained by the provider of the online service, e.g., using customer account manager 318. User database 504 can contain a record for each user that can include a user identifier (any unique identifier, e.g., a login name, email address, or account number, that a user would be expected to provide when interacting with the online service) and other data about the user, such as a country identifier. In some embodiments, a new record can be added to user database 504 upon creation of each user account, and the account creation process can include asking the new user to identify her country of residence or citizenship. Other techniques can be used to populate user database 504, and process 500 can proceed independently of the manner in which user database 504 is populated.

In addition, since the report is based on active users (defined for purposes of this example as users who interacted with the online service at least once during the relevant time period), workflow 500 requires information about which users interacted with the online service and when. This information can be obtained from activity logs 506 maintained by the online service provider, e.g., using logging system 316 of FIG. 3. Logs 506 can include an entry for each transaction of a user with the online service (or for selected transactions), and each entry can indicate the date/time, the type of transaction (e.g., logging in or out, uploading or downloading a file, purchasing an item, posting content, etc.), the user identifier, and other information as desired.

To make data accessible to system 300, workflow 500 can include jobs that import the data from external sources such as user database 504 and activity logs 506 into analytics database 320. For example, "import user table" job 508 can read user database 504 and create or update a snapshot user table 510 that is stored in analytics database 320. User table 510 can be a snapshot of user database 504 as of a cutoff time associated with generation of report 502. In some embodiments, job 508 can be a job that is scheduled to run periodically (e.g., once per day). As described above, job 508 can be implemented to create an initial snapshot and update the snapshot based on activity logs, rather than repeatedly processing user database 504.

Similarly, "import activity logs" job 512 can read an activity log 506 that covers a relevant time interval (in this case, a one-hour period) and generate a database table 514 that can include a deduplicated list of all user identifiers that had at least one transaction entry in activity log 506. In some embodiments, the table can include other information, such as how many or what kind(s) of transactions were logged for each user identifier. Like job 508, job 512 can be a job that is scheduled to run periodically (e.g., once per hour). Unlike job 508, job 512 can be an interval job that generates a separate data table 514 for each hour's activity log 506. Accordingly, job 512 can generate hourly activity data tables 514 at a rate of 24 tables per day, and tables 514 can be retained for as long as desired (e.g., 30 days, 90 days, one year). In some embodiments, hourly activity data tables 512 can be consumed by a number of different jobs including later jobs within workflow 500 as well as other jobs (not shown) outside workflow 500. For instance, hourly activity data tables 512 can be used to generate statistical data regarding system usage over the course of a day.

For purposes of generating a report covering a 28-day period, hourly activity data tables 514 can be aggregated by subsequent jobs. For example, "daily active list" job 516 can merge 24 hourly data tables 514 into a single (deduplicated) daily data table 518. Like job 512, job 516 can be an interval job that generates a separate data table 518 for each day. Accordingly, job 516 can generate daily activity data tables 518 at a rate of one table per day, and tables 518 can be retained for as long as desired (e.g., 30 days, 90 days, one year). Like hourly activity data tables 514, daily activity data tables 518 can be consumed by a number of different jobs including later jobs within workflow 500 as well as other jobs (not shown) outside workflow 500.

Similarly, "7-day active list" job 520 can merge seven daily data tables 518 into a single (deduplicated) seven-day data table 522. In this example, job 520 can be executed daily to produce successive tables 522 to cover a rolling seven-day period, with each successive pair of tables 522 including six days of overlapping data. Accordingly, job 520 can generate seven-day activity data tables 522 at a rate of one table per day, and tables 522 can be retained for as long as desired (e.g., (e.g., 30 days, 90 days, one year). Like hourly activity data tables 512 or daily activity data tables 518, seven-day tables 522 can be consumed by a number of different jobs including later jobs within workflow 500 as well as other jobs (not shown) outside workflow 500.

One consumer of seven-day tables 522 can be "28-day active list" job 524, which can merge four contiguous (but non-overlapping) seven-day tables into a single table 526 listing all active users for a period of 28 days. Like job 520, job 524 can run daily to produce a table 526 that covers a rolling 28-day period, with consecutive tables 526 including 27 days of overlapping data.

"Active users per country" job 528 can perform a join operation on 28-day activity table 526 and user table 510 (which lists all registered users) to determine a country for each active user, thereby producing a country list 530. In various embodiments, country list 530 can include a table associating each active user identifier with a country and/or statistical information such as the number of active user identifiers per country. Like jobs 520 and 524, job 528 can run daily to produce successive lists 530 covering a rolling 28-day period.

Reporting job 532 can generate a report based at least in part on country list 530. For example, if country list 530 includes statistical information, reporting job 532 can format the statistical information in a user-readable form (e.g., a table, graph, or the like), and create report 502 (e.g., a data file such as a PDF or HTML document) that includes the information. If country list 530 includes a data table, reporting job 532 can include computing statistical information based on the data table as well as formatting the information and creating a user-readable report. In some embodiments, reporting job 532 can include delivering report 502 to one or more end users (e.g., analysts, executives, or other employees of the online service provider), e.g., via email, Intranet document repository, or the like.

Reporting job 532 can also incorporate data from other workflows (not shown) into the report. For instance, active users can be analyzed in a variety of demographic dimensions (e.g., age, gender, education level, income level, etc.) provided that corresponding information about registered users is available. Quantity and or type of user activity can be statistically analyzed and reported on.

Workflow 500 is intended as illustrative of workflows that can be defined in an analytics system such as system 300. It is to be understood that the details of the workflow can be varied. For example, if there is not a need for a rolling seven-day activity report, job 520 can be scheduled to execute weekly rather than on a rolling daily basis. Further, it is to be understood that multiple workflows can be defined in an analytics system and that different workflows can have interdependencies, such that a single source job can produce data that is consumed by multiple sink jobs that perform different operations. For instance, as noted above, a job in a workflow that produces a report on service usage per hour can consume hourly activity data tables 514.

FIG. 5 indicates, using arrows, the dependencies of various jobs on data tables. As described above, an analyst defining jobs 508, 512, 516, 520, 524, 528, and 532 can specify the source data table(s) that each job consumes and the output data table(s) that each job produces. For example, an analyst can create a job definition file for job 524 that specifies that the job consumes four instances of 7-day activity tables 522, produces one instance of 28-day activity table 526, and operates by merging and deduplicating four 7-day activity tables 522 to produce the 28-day activity table 526. In some embodiments, some or all of the job definitions can be parameterized. For example, the job definition file for job 524 can be parameterized by defining the end of the interval covered by job 524 as time "0" and the start time of the interval as time "−28 days" (seconds, hours, or other time units can be used as desired); the output table therefore covers an interval ("−28 days", "−0 days"). The source tables can then be defined as the seven-day source tables covering the intervals ("−28 days", "−22 days"); ("−21 days", "−15 days"); ("−14 days", "−8 days"); and ("−7 days", "−0 days"). Each time the job is run, a specific end date for that instance of the job can be specified (e.g., Apr. 1, 2013), and the correct instances of the source tables can be identified accordingly. From this, workflow manager 302 of FIG. 3 can infer dependencies of each instance of execution of a job on specific instances of execution of other jobs.

Figure 6:
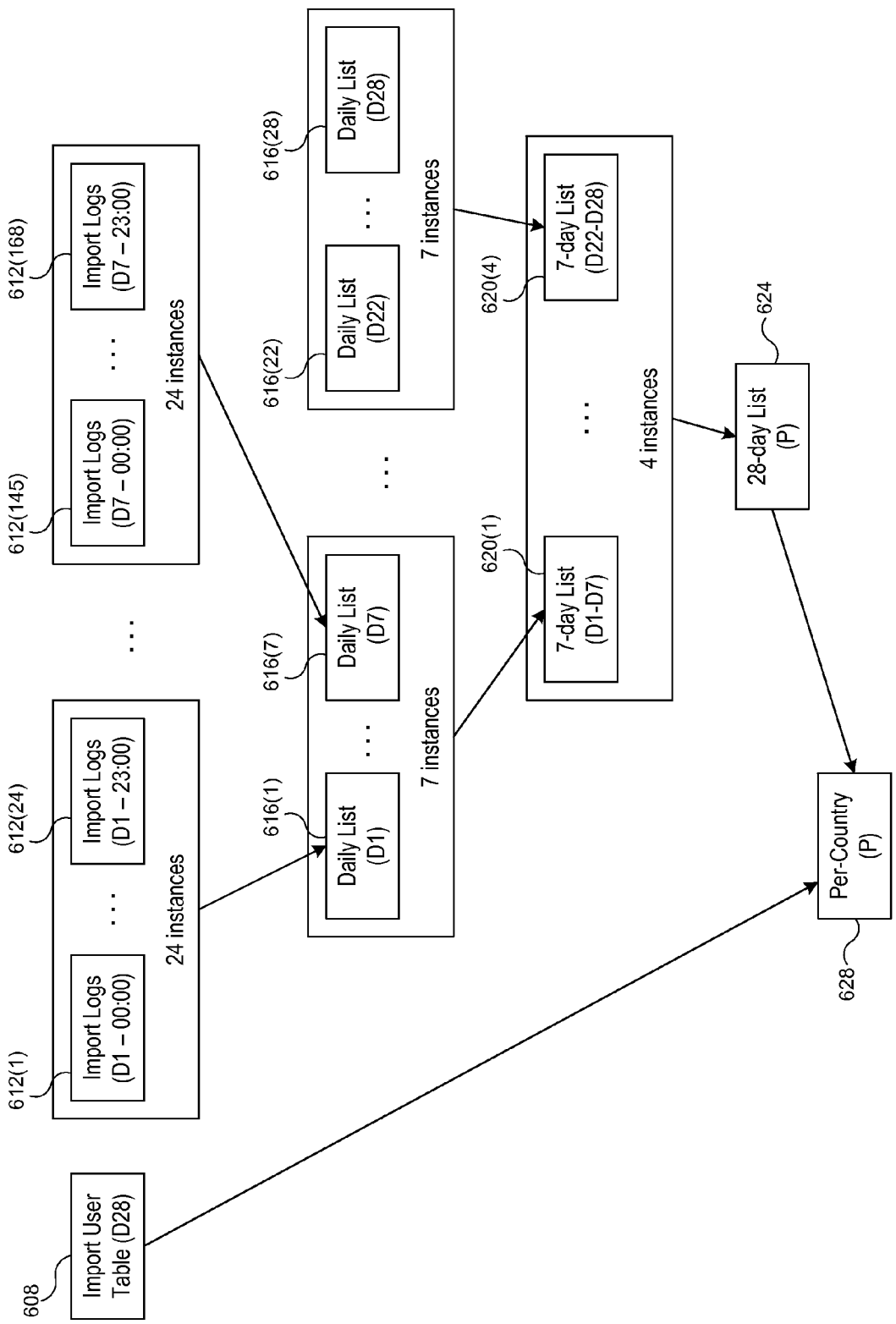
FIG. 6 shows examples of inferred dependencies between specific instances of execution of jobs in the workflow of FIG. 5 according to an embodiment of the present invention.

FIG. 6 shows dependencies between specific instances of execution of different jobs in workflow 500. (Due to space constraints, not all dependencies are shown.) In some embodiments, these dependencies can be inferred by workflow manager 302; examples are described in above-referenced U.S. application Ser. No. 14/103,671 filed Dec. 11, 2013. In other embodiments, some or all of the job-to-job dependencies can be manually defined by an analyst. In FIG. 6, each instance of job execution is identified by the date (and time in the case of hourly jobs) of the data it processes. Within a 28-day period P, days are consecutively numbered D1-D28, and hours within each day are numbered using 24-hour time (choice of time zone can be as desired).

Working backward in time, a goal is to execute a specific instance of job 528, shown in FIG. 6 as "Per-country (P)" instance 628, that covers the 28-day period P. As shown in FIG. 5, job 528 requires a 28-day activity table 526 that is generated by job 524. Accordingly, FIG. 6 shows an inference that job instance 628 depends on "28-day list" job instance 624, which is the instance of job 524 of FIG. 5 that covers the 28-day period P. Continuing, as shown in FIG. 5, job 524 consumes four instances of 7-day activity tables 522, specifically tables for D1-D7, D8-D14, D15-D21, and D22-D28. Accordingly, job instance 624 depends on four job instances 620(1)-620(4), each of which is a different instance of job 520 of FIG. 5 covering a different 7-day period.

As shown in FIG. 5, each instance of job 520 depends on seven daily activity tables generated by job 516. Accordingly, FIG. 6 shows an inference that job instance 620(1) depends on seven daily job instances 616(1)-616(7), each of which is an instance of daily job 516 of FIG. 5 that covers a different day; similarly, job instance 620(4) depends on seven daily job instances 616(22)-616(28). In turn, as shown in FIG. 5, each instance of job 516 depends on 24 hourly instances of job 512. Accordingly, FIG. 6 shows an inference that job instance 616(1) depends on 24 hourly job instances 612(1)-612(24), while job instance 616(7) depends on 24 hourly job instances 612(145)-612(168).

Finally, per-country job instance 628 requires a user table that includes data for the 28-day period P; accordingly, it can be inferred that job instance 628 depends on job instance 608, which is the instance of daily user table job 508 that snapshots the user database through the end of period P (i.e., the daily job for day D28).

As FIG. 6 shows, a single instance 628 of execution of the users-per-country job 528 actually entails dependencies on a very large number (e.g., 192) of other job instances. It should be noted that the analyst defining a workflow does not have to specify all or even any of these job-to-job dependencies. Instead, the analyst can simply specify what data table(s) must be present and up-to-date in order to execute a particular sink job, and workflow manager 302 can infer the dependencies, e.g., by identifying what source job(s) produce the table(s) required by the sink job.

After dependencies between job instances have been determined, workflow manager 302 can proceed to execute job instances based on the schedule. Execution of job instances (also referred to as execution of jobs) can include, e.g., dispatching jobs to task runner 312 of FIG. 3. In some embodiments, execution can be dynamic in that the start time of a given job instance is determined based on completion of all job instances on which the given job instance depends. For example, job instance 624 of FIG. 6 can be held in a not-ready state until all job instances 620(1)-620(4) have been completed, and job instance 624 can be launched at any time thereafter.

Further, as described above, workflow manager 302 can schedule an instance of a sink job based on completion of the source-job instances on which the sink job instance depends. In some embodiments, successful completion of a source job can be required as a condition for executing a sink job. In other embodiments, some or all of the dependencies can be classified as "weak" dependencies, meaning that while the sink job should wait until the source job completes, successful completion of the source job is not required.

For example, a job instance can complete with or without errors. As used herein, a "successful" job instance refers to the case where the job completed without errors. To distinguish among job instances that complete with errors, various error modes can be defined. For example, an error mode of "failed" (also referred to as "hard failure") can be used to indicate that the job failed to complete, while an error mode of "soft failure" can be used to indicate that the job successfully processed the input data it received, but not all of the expected data was received or that output data generated by the job fails to satisfy some metric of plausibility defined within the job (e.g., number of transactions in a given time interval is suspiciously high or suspiciously low relative to expected levels of user activity). In some embodiments, where a dependency is classified as a weak dependency, a sink job can be executed if the source job experienced a soft failure but not if it experienced a hard failure. Where a sink job is executed using output from a source job that experienced a soft failure, the sink job can also be assigned a soft failure status by default. In embodiments where workflow manager 302 uses status metadata for a source data table to determine when to execute a sink job, the status metadata can include an indication of the completion status of each job that contributed to the source data table. In some embodiments, an analyst defining a job can specify the required completion status of the source jobs; for instance, a dependency on a table can be classified as "strong" (successful completion of all source jobs required) or "weak" (successful completion or soft failure of all source jobs required). Output data tables produced by a sink job that used as input data that had a soft failure can also be flagged as having a soft failure; in some instances, if a further error occurs in a sink job, a soft failure can become a hard failure. Other techniques for allowing data tables (or other data objects) with soft failures to be consumed by downstream jobs can be used.

Jobs that experience hard failures can be rescheduled. In some embodiments, rescheduling can occur automatically, e.g., in response to workflow manager 302 of FIG. 3 receiving a report of a hard failure from task runner 312. In some embodiments, a hard failure can generate an alert to a system operator (who can be, e.g., an analyst or system administrator or other individual(s)), and the operator can investigate the cause of the failure before confirming that the job should be rescheduled.

Jobs that experience soft failures can run to completion and produce output data, and this data can be consumed by sink jobs as if no failure occurred. Data from such jobs, however, might not be reliable. Automated or manual monitoring of job output can be useful in detecting unreliable ("invalid") data and determining whether to re-execute a job that experienced a soft failure.

Accordingly, certain embodiments of the present invention provide monitoring and invalidation systems that can facilitate identification and invalidation of executed jobs ("jobs" and "job instances" are used interchangeably in this context) where errors have occurred. In some embodiments, the monitoring system allows an operator (e.g., an analyst) to review quality-control data for a completed job (which might or might not include the output data object produced by the job) and to determine whether the job (or the output data object produced by the job) should be invalidated. The operator may be able to choose whether to invalidate a single "base" job or the base job and its "descendants" (i.e., any jobs that depend, directly or indirectly, on an output data object produced by the base job). Further, the monitoring system can facilitate operator review of "antecedent" jobs whose output data objects were consumed, directly or indirectly, by the base job to determine whether and how far invalidation should proceed up the dependency chain. In some embodiments, review of quality-control data and determinations as to whether to invalidate jobs can be wholly or partially automated.

Quality control review can be based on any data provided by the job, including but not limited to the output data object(s) generated by the job. For example, in some embodiments, each instance of job execution generates a log file that can provide data usable for quality-control review. FIG. 7 shows a log file 700 that can be generated by a job according to an embodiment of the present invention. Log file 700 can include a job ID 702, which can be a serial number or other identifier assigned to the job upon its initiation by task runner 312 or workflow manager 302; the identifier can be any identifier usable to distinguish a given instance of execution of a job from other instances of executing a job having the same definition. Job definition section 704 can include information identifying the task performed by the job. For instance, job definition section 704 can include a name of the job definition file that defines the job's inputs, outputs, and function(s) (e.g., as described above), as well as the specific starting and ending times of the interval covered by the job. (In the case of a snapshot job, there might be no starting time.) In some embodiments, job definition section 704 can include the operation(s) executed by the job, and a separate job definition file is not required.

Execution start and end times 712 can indicate when execution of the job began and ended. For instance, execution can start when task runner 312 sends the job to distributed computing systems 314 and end when distributed computing systems 314 report completion to task runner 312. Quality-control section 714 can include information about the volume of data consumed and/or produced, for example, the numbers of database partitions or rows read from each source data object, the number of database partitions or rows written, etc. Completion status section 716 can indicate success ("OK") if the job instance completed successfully. If not, any hard or soft failure indications, warning messages, and so on can be included in section 716. Other types of information about the job or its execution can be included in addition to or instead of these examples, such as an identification of which specific system(s) within distributed computing systems 314 participated in executing the job.

Log file 700 for a particular job (in this context, the term "job" refers to an instance of execution of a defined job) can be generated as the job is executed. In some embodiments, log file 700 can be stored in job logs data store 328 of system 300.

Log file 700 can provide information that allows quality-control review without accessing the actual output data object(s) produced by the job. For example, in the case of analytics related to user interaction with an online service, there may be an average volume of activity, which can be subject to fluctuations (e.g., hour-to-hour or day-to-day) and long-term trends, but sudden large changes may be statistically anomalous. Thus, assuming no changes in the processing capacity of analytics system 300 of FIG. 3, the execution time or volume of data produced by jobs that process information about user activity can be expected to exhibit a similar degree of stability. Accordingly, anomalies in processing time and/or data volume can be indicative of errors in the output data object. In some embodiments, the output data object itself can be analyzed during quality control (e.g., by querying the output data object to find out how many records it contains).

In some embodiments, quality-control review and job invalidation can be controlled by an operator and facilitated by the system, exploiting its awareness of dependencies. An interface for system-facilitated, operator-controlled job invalidation will now be described.

Figure 8:
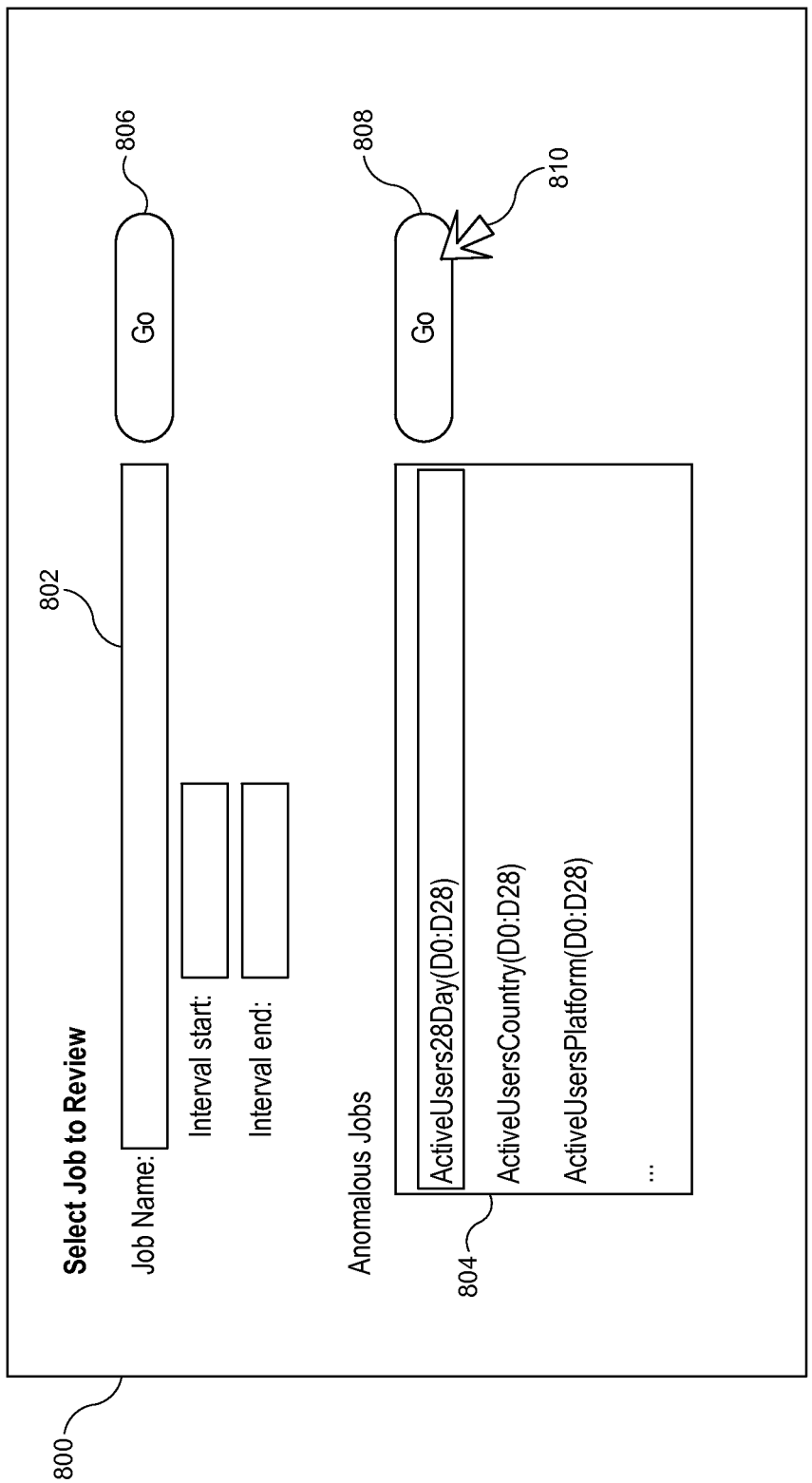
FIG. 8 shows a user interface screen for initiating quality control review according to an embodiment of the present invention.

FIG. 8 shows a user interface screen 800 that can be presented to an operator for manually initiating quality control review according to an embodiment of the present invention. User interface screen 800 can be implemented, e.g., in monitoring interface 306 of FIG. 3. User interface screen 800 can provide a gateway into quality control data by allowing an operator to identify an executed job to be reviewed. Text box 802 can allow the user to enter the name of the job and the interval of interest. In some embodiments, auto-completion suggestions or other mechanisms can be used to speed entry of job names. This can be used, e.g., where questions have been raised about data presented in a report such as report 502 of FIG. 5.

In an example of system facilitation, selection box 804 can present a list of jobs with anomalous results as identified by graphing system 326. In some embodiments, graphing system 326 can read data from job logs 328 and/or statistics store 324 and perform various operations. For example, graphing system 326 can compare corresponding quality-control data in job log files 700 from different instances of executing the same job (e.g., daily active users job 516 for different days). If a statistical anomaly is detected (e.g., number of records written is more than three or five standard deviations from an expectation value), the job can be classified as anomalous and listed in selection box 804. As another example, anomalous results can be detected based on completion codes 716 in log files 700; for instance, any job with a soft failure can be listed as anomalous. In some embodiments, each listing in selection box 804 can indicate the nature of the anomaly (e.g., "3 sigma low" or "input data missing").

From screen 800, an operator can identify a job to be reviewed and select "go" button 806 or 808 (e.g., using cursor 810) to proceed with the review. In some embodiments, any job that has executed can be selected. In some embodiments, if the name of a job entered in text box 802 refers to a job that has not completed execution or that has already been invalidated, the interface can so inform the operator and return to screen 800 to await another selection.

Figure 9:
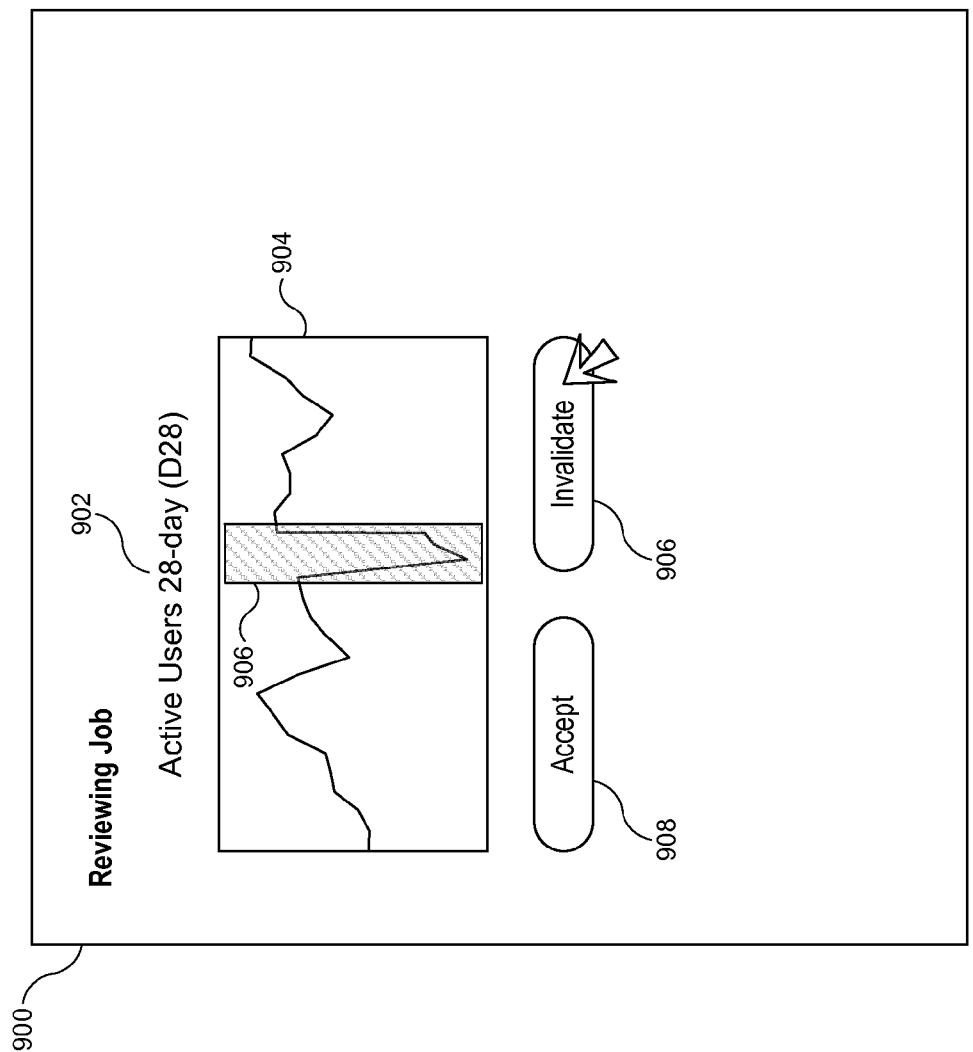
FIG. 9 shows an interface screen for reviewing a job according to an embodiment of the present invention.

Once the selection is made, detailed information about the selected job can be presented to the user. FIG. 9 shows an interface screen 900 for reviewing a job according to an embodiment of the present invention. In this example, the operator has selected job instance 624 of FIG. 6, as indicated by title area 902. Graph area 904 can present a graphical representation of data related to the selected job instance, such as the number of records read from each source data table. In some embodiments, e.g., where the job to be reviewed was flagged as anomalous by graphing system 326, the anomalous data can be highlighted as shown at 906. In some embodiments, screen 900 can provide user-operable controls to allow the user to highlight anomalous portions of the displayed data, allowing the operator as well as the system to identify specific anomalies.

Other data and/or representations can be used, and representations of multiple data items pertaining to the same job can be presented on the same screen. For instance, another display element (not shown) can present the execution time for this job instance as compared to the average execution time for some number (e.g., 10, 20) of previous instances of the job. In some embodiments, selection options can be provided to allow the user to select what data should be presented and the format of the representation (e.g., bar charts, timelines, numerical, etc.). Multiple types of data can be presented concurrently on one screen or via a set of interlinked screens with user-operable controls for navigating among the screens.

The operator viewing interface 900 can choose whether to invalidate the job (button 906) or accept the job (button 908). Selection of button 908 can result in screen 800 of FIG. 8 being displayed, allowing the operator to select another job to review. In some embodiments, accepting the job via button 908 can also result in the job or its output data being assigned a "validated" status. Jobs that have been validated can be excluded from further review. For instance, if the job shown in screen 900 was listed as an anomalous job in area 804, operator acceptance of the job using button 908 can result in the job no longer being listed in area 804. In some embodiments, validated jobs can be available for further review, but more than one operator's input may be required to invalidate the job.

Figure 10:
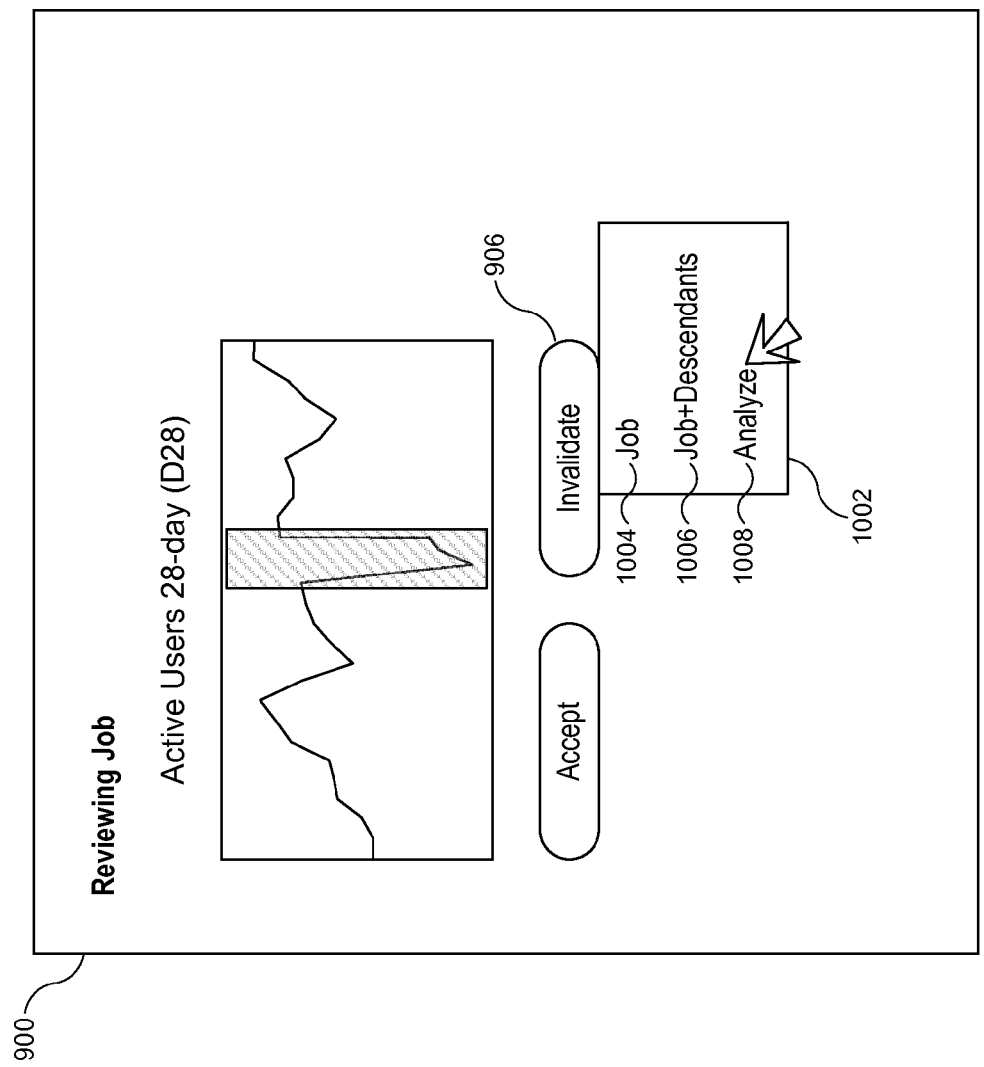
FIG. 10 shows an interface screen with additional options for reviewing a job according to an embodiment of the present invention.

FIG. 10 shows additional options that can be presented on interface screen 900 if the user selects invalidate button 906. Pop-up menu 1002 can appear, offering options to invalidate only the job (option 1004), to invalidate the job and its descendants (option 1006), or to perform further analysis to identify antecedent jobs to invalidate (option 1008).

Selection of option 1004 can result in invalidating the job. As used herein, "invalidating" a job can include any operation that results in the analytics system being able to recognize the output data of the job as invalid (and therefore not to be relied on). For example, monitoring interface 306 can notify workflow manager 302 that the job has been invalidated, and workflow manager 302 can update various data objects accordingly. For example, workflow manager 302 can update a job log file or other data structure in job logs data store 328 to indicate that the job is invalid and its results cannot be relied on. Additionally or instead, workflow manager 302 can mark the output data object(s) generated by the invalidated job as invalid, e.g., by updating a metadata field associated with the output data object. As another example, in some embodiments, invalid data objects can be deleted. Invalidating a job can affect scheduling of other jobs that have not yet executed; for instance, execution of a job that depends on the output of an invalid source job may be delayed until the source job becomes valid.

Referring again to FIG. 10, selection of option 1006 can result in invalidating the job being reviewed and its descendant jobs, i.e., any jobs that depend, directly or indirectly, on the output data object generated by the selected job. Thus, for example, in FIG. 6, job instances 616(1), 620(1), and 624 would all be considered descendants of job instance 612(1). To the extent that an invalid output data object at an early stage of processing "infects" the output objects of subsequent consumer jobs, the ability of an operator to invalidate all descendants of a given job in a single interaction can speed up quality-control review, as the operator does not need to individually identify or review any of the descendant jobs.

Figure 11:
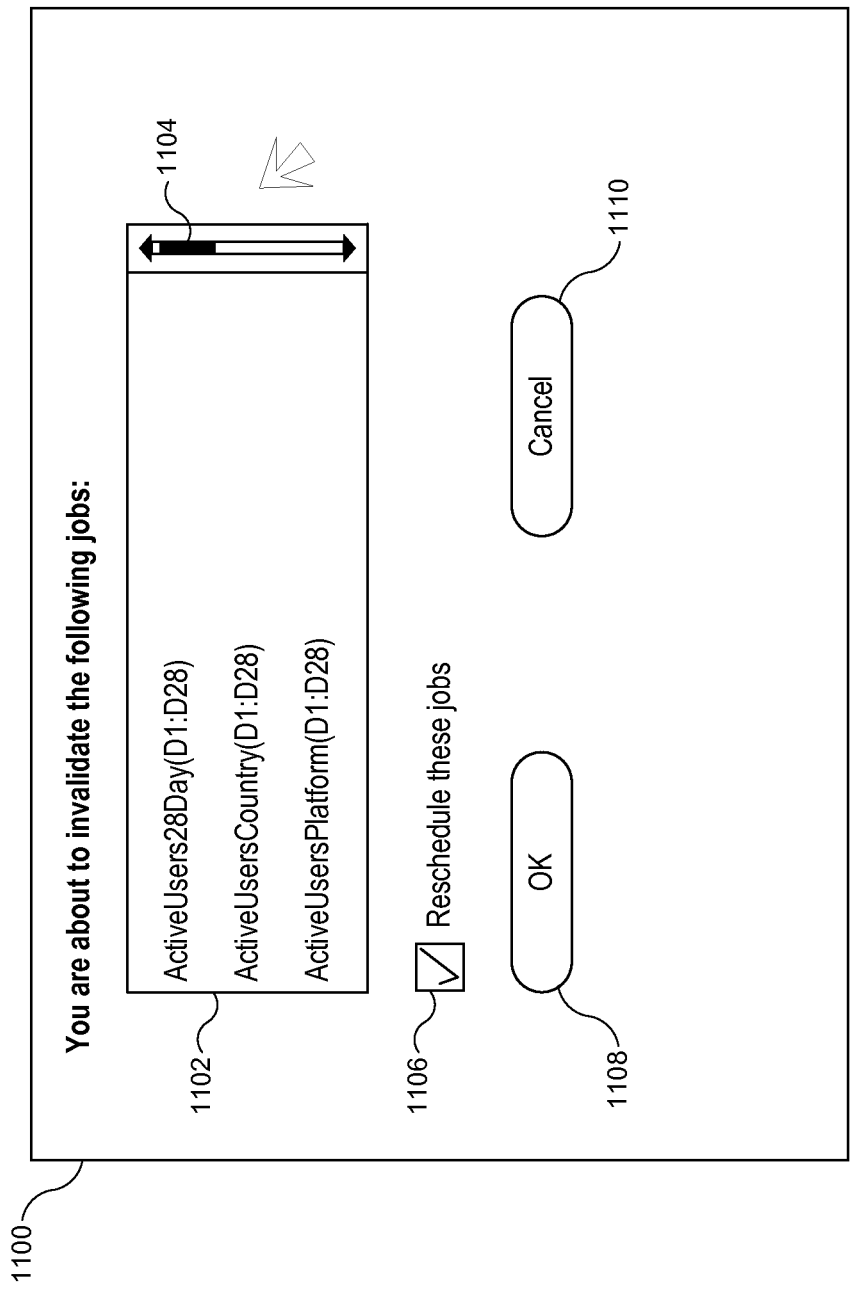
FIG. 11 shows a confirmation interface screen for invalidating jobs according to an embodiment of the present invention.

In some embodiments, invalidating a job and its descendants can invalidate a significant quantity of data, and an operator may not always know the scope of what will be invalidated. Accordingly, it may be desirable to inform the operator of the scope of the invalidation and obtain operator confirmation prior to proceeding. FIG. 11 shows a confirmation interface screen 1100 that can be presented when an operator selects option 1006 from menu 1002 of FIG. 10 according to an embodiment of the present invention. Screen 1100 can present a list 1102 of jobs that will be invalidated, including the job the operator selected (which can be first in the list) and all of its descendants. In some embodiments, job-definition and dependency information determined or maintained by workflow manager 302 (e.g., as described above) can be used to automatically identify all descendant jobs that have executed. Invalidation generally applies to jobs that have executed; accordingly, rather than invalidating any descendant jobs that have not executed, workflow manager 302 can simply defer their execution until their (invalid) source jobs are re-executed.

List 1102 can be long, and in some embodiments, a scrolling interface control 1104 can be provided so that only a portion of list 1102 is visible at a given time.

In some embodiments, a job that is invalidated can be rescheduled or not at the operator's discretion. For example, interface screen 1100 can include a checkbox control 1106 that is operable to indicate whether the invalidated jobs should be rescheduled. In some embodiments (not shown), the operator can indicate on a per-job basis which jobs should be rescheduled in addition to or instead of providing a global selection using checkbox control 1106. For instance, it may be that the output of a particular job is no longer of interest, in which case it may be desirable to avoid expending any resources on re-executing it. In still other embodiments, all jobs that are invalidated are automatically rescheduled.

Where rescheduling is at the operator's discretion, screen 1100 can provide additional information (not shown) to guide rescheduling decisions. Examples of such information can include the estimated processing time for the job, the number and/or names of descendants of the job, and so on.

After reviewing the list of jobs to be invalidated, the operator can select control 1108 to confirm that invalidation should proceed or control 1110 to cancel the invalidation.

When control 1108 is selected, monitoring interface 306 can provide identifiers of the jobs on list 1102 to workflow manager 302. In response, workflow manager 302 can invalidate the identified jobs. If rescheduling is indicated (by default or by operator interaction with interface screen 1100), workflow manager 302 can reschedule the invalidated jobs, e.g., by adding the jobs into its pool of jobs to be executed. As described above, execution of a given job can be blocked until its source data objects are available. Accordingly, if a job and its descendants are invalidated and rescheduled, the rescheduled execution will respect the dependencies among the jobs.

In some embodiments, some or all requests to invalidate and/or reschedule jobs may require approval by a second operator, e.g., if the amount of data being invalidated or the execution time required to re-execute the invalidated jobs exceeds some threshold, or if one operator attempts to invalidate a job that was previously marked valid. Where further approval is required, monitoring interface 306 can automatically generate alerts or approval requests to appropriate personnel.

After the operator has selected control 1108 or control 1110, the monitoring interface can return to screen 800 of FIG. 8 to allow selection of another job to review. Any jobs that were invalidated can be removed from the list of anomalous jobs (assuming they were present).

Invalidating a single job and its descendants can result in efficiently repairing a significant amount of invalid data. However, in some instances, invalidity of one job is as a result of a problem in an antecedent job (which can be any job whose output data object is directly or indirectly consumed by the invalid job), and an operator reviewing an invalid job may not be able to readily ascertain the root cause of the invalidity.

Accordingly, some embodiments of the present invention provide an analysis option to assist the operator in finding the "root" invalid job (i.e., the first job in a chain of dependent jobs that produced invalid data). This option can be invoked, e.g., by selecting the Analyze option 1008 from menu 1002 of FIG. 10. Selecting option 1108 can place monitoring interface 306 into analysis mode.

Figure 12:
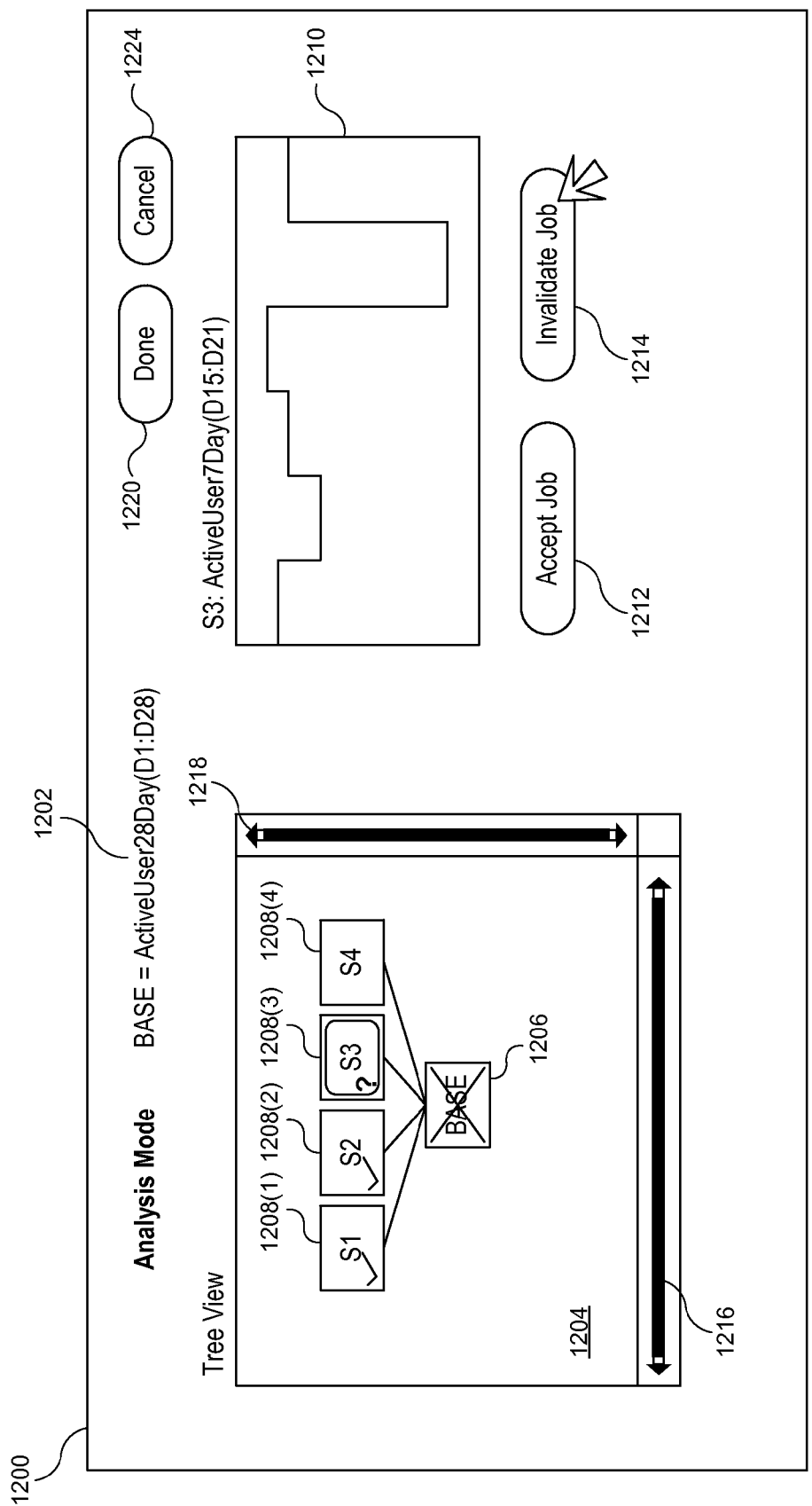
FIG. 12 shows an interface screen for an analysis mode according to an embodiment of the present invention.

FIG. 12 shows an interface screen 1200 for an analysis mode according to an embodiment of the present invention. In this example, the analysis mode allows the operator to systematically explore a "tree" of antecedent jobs for a "base" job that has been identified as invalid and inspect each one to assess its validity. The antecedent jobs can include any job whose output data is consumed, directly or indirectly, by the base job.

Analysis screen 1200 can include an identifier area 1202 that indicates the base job being analyzed. Tree view area 1204 can present a visual representation of the base job and its antecedents as a series of icons. Icon 1206 can represent the base job (in this example, corresponding to job instance 624 of FIG. 6). Icons 1208(1)-1208(4) can represent the source jobs for the base job (in this example, corresponding to job instances 620(1)-620(4) of FIG. 6).

Each icon 1206, 1208 can include markings to indicate the quality-control status of the associated job. For instance, the base job has already been identified as invalid, as indicated by an "X" through icon 1206. In this example, two of the four source jobs have already been reviewed and accepted (e.g., by the operator interacting with analysis screen 1200), as indicated by checkmarks in icons 1208(1) and 1208(2). In this example, quality control status indicators can also include an indication of whether an anomaly was detected by graphing system 326 (the criteria can be the same as for anomaly list 804 in FIG. 8); here, the third source job has a detected anomaly, as indicated by the question mark in icon 1208(3). Other markings can be used, such as decorations, color changes, font changes, changes in the job icons' shape, etc.

Other navigational cues can be provided. For example, in FIG. 12, the operator has selected the third source job, and icon 1208(3) is highlighted. Highlighting the job currently under review can help the operator keep track of the larger context. As another example, due to space constraints, the icons in tree view 1204 may not display the names of the jobs. In some embodiments, hovering a cursor over an icon may trigger a popup display of the job name. This can also help the user identify a specific job.

In some instances, the tree can be larger than area 1204, and scroll bars 1216, 1218, or a panning control or the like, can be provided, allowing the operator to view different portions of the tree. In some embodiments, a zoom control can be provided, allowing the operator to zoom out (e.g., to see all of a large tree at once) or zoom in to focus on a specific portion of the tree.

Graph area 1210 can present a graphical representation of quality-control data related to the selected job. The presentation can be similar or identical to graph area 904 of interface screen 900 described above, and any data or representation thereof that can be used by an operator to evaluate the likely validity or invalidity of the job's output can be presented in graph area 1210. In some embodiments, where an anomaly was detected, the anomaly can be highlighted, e.g., as described above. As with screen 900, multiple representations of quality-control data can be presented using a single screen or a set of interlinked screens.

After reviewing a job, the operator can select button 1212 to accept the job or button 1214 to invalidate the job. In some embodiments, the user can select an icon in tree view 1204 for a job that is already marked as invalid. In that case, button 1214 can be grayed out or changed to a button to undo the invalidation. (As described below, in some embodiments, no jobs are actually invalidated until the user has completed analysis using screen 1212, and an undo option may be helpful.)

The user can exit analysis screen 1202 at any time. For example, selecting "Done" button 1220 can indicate that the user is finished and that the results of the analysis should be committed; that is, all jobs in tree 1204 that have been marked as invalid should be invalidated. Selecting "Cancel" button 1222 can allow the user to exit analysis screen 1202 (e.g., returning to screen 800 or 900) without actually invalidating any jobs.

Analysis screen 1200 can allow an operator to review quality-control data for any job in the tree and to invalidate or accept each reviewed job. In some embodiments, an operator can select jobs to be reviewed in any order, e.g., by selecting the corresponding icon in tree view 1204. In other embodiments, monitoring interface 306 can select the next job to be reviewed, walking the user through tree view 1204 in a logical sequence. For example, monitoring interface 306 can first present the direct source jobs of the base job, then present source jobs for any source job that is invalidated by adding icons in tree view 1204.

Figure 13:
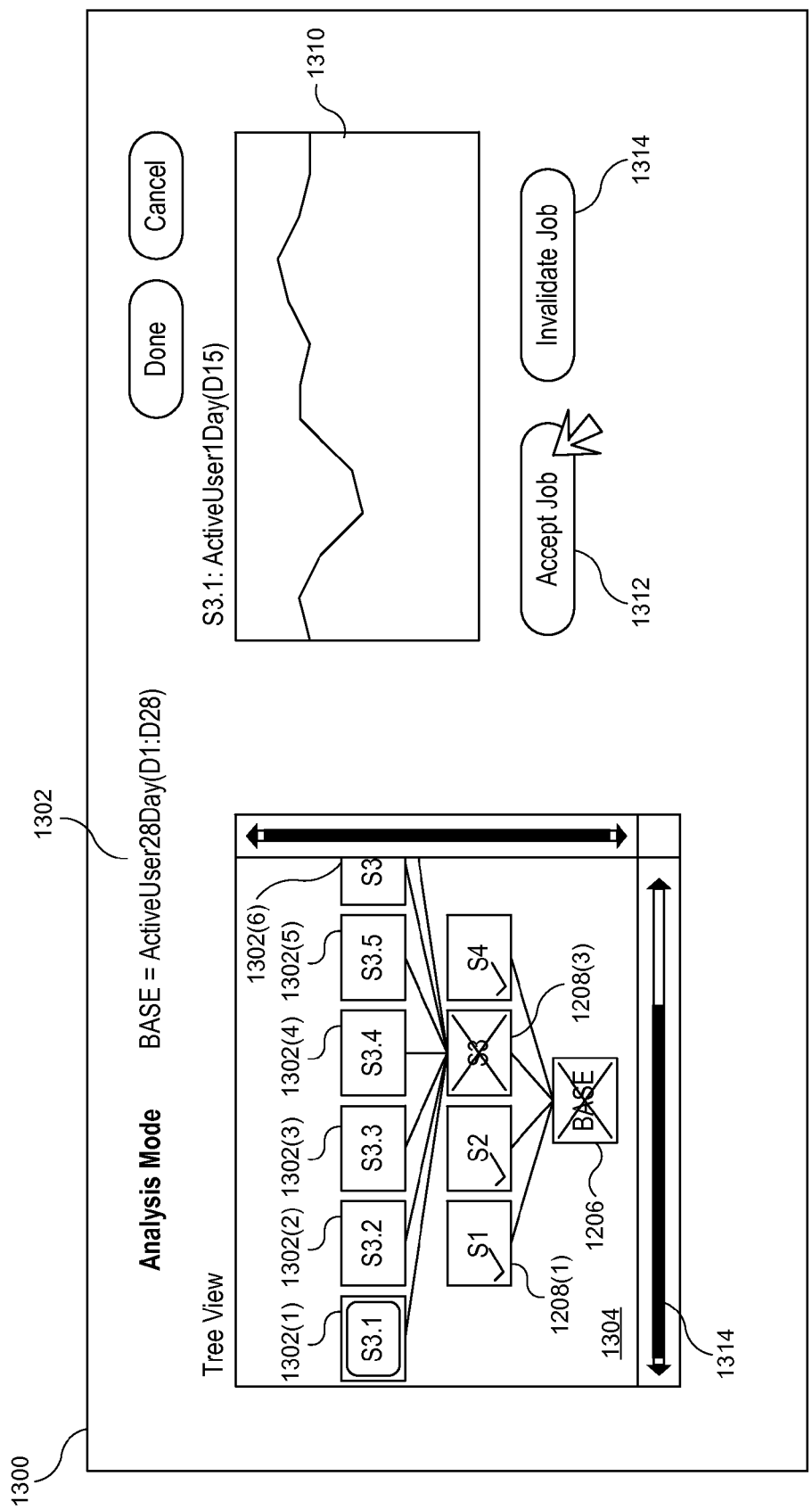
FIG. 13 shows another analysis interface screen according to an embodiment of the present invention.

By way of illustration, suppose that at screen 1200, the operator selects button 1214 to invalidate the S3 source job. Monitoring interface 306 can proceed to show the S4 source job (corresponding to icon 1208(4)). For purposes of illustration, suppose that the operator selects button 1212 to accept the S4 source job. At that point, monitoring interface 306 can add additional nodes to tree view 1204. FIG. 13 shows another analysis interface screen 1300 according to an embodiment of the present invention. Screen 1300 can correspond to screen 1200 after the user has evaluated all jobs corresponding to icons 1208(1)-1208(4). Screen areas 1302, 1304, and 1310 can be generally similar to screen areas 1202, 1204, and 1210 described above. However, tree view area 1304 now displays additional icons 1302(1)-1302(6) representing source jobs S3.1-S3.6 of the invalid source job S3 (icon 1208(3)). (A seventh source job is invisible beyond the right edge of region 1304.) Icon 1302(1) is highlighted, and quality-control data for the corresponding source job (S3.1, active users for day D15) is shown in area 1310. The operator can select button 1312 to accept the job or button 1314 to invalidate it. Once the operator has made a selection, monitoring interface 306 can present the next source job in the new row (corresponding to icon 1302(2)), and so on until the row is completed. Automatic walking of the tree can end when either there are no further antecedent source jobs or when a state is reached at which all source jobs at the deepest level back in time have been accepted (or no source jobs have been invalidated). In this example, automatically walking the tree would not include review of the source jobs for jobs S1, S2, or S4 because the operator has accepted those jobs.

Figure 14:
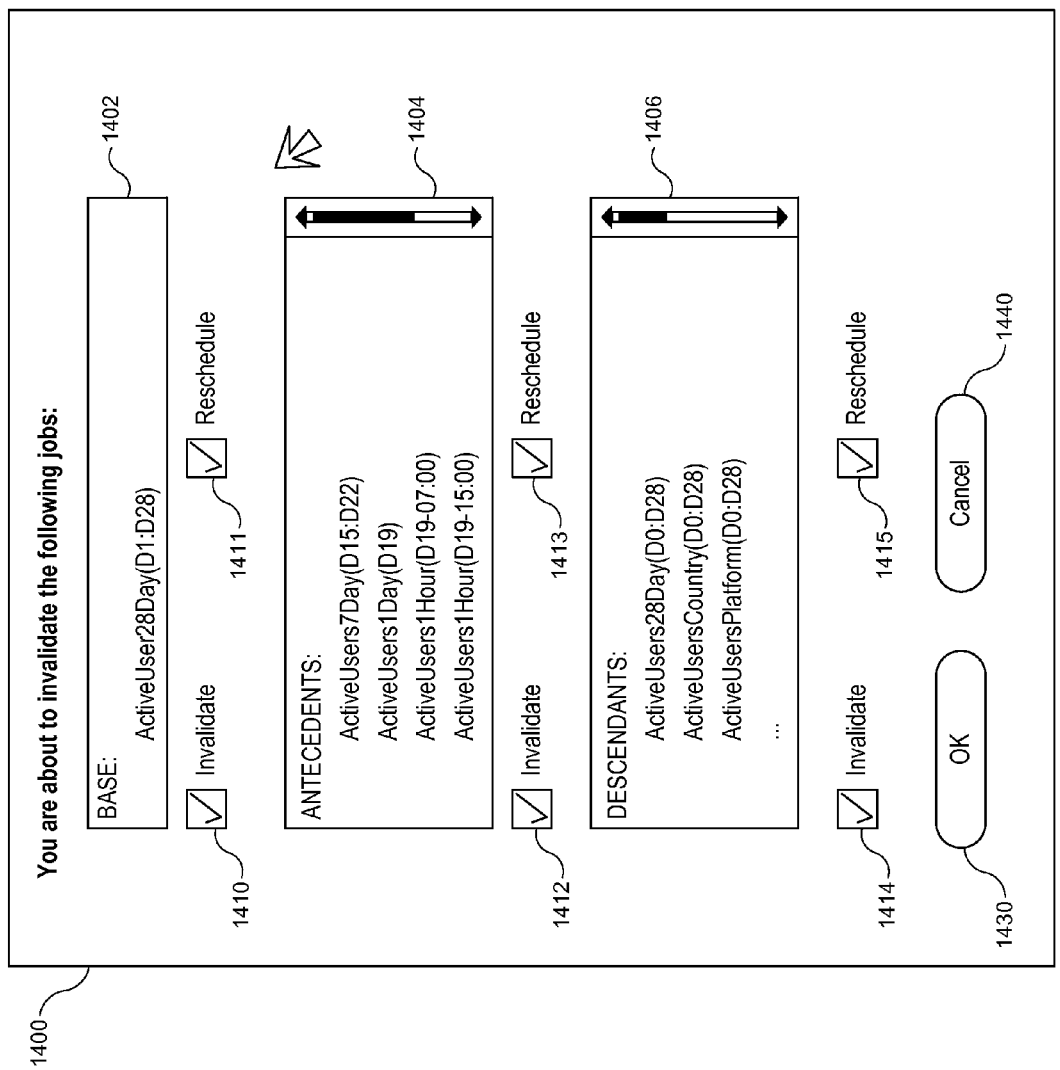
FIG. 14 shows an example of a confirmation screen according to an embodiment of the present invention.

Once the operator has finished analysis (e.g., when automatic walking of the tree ends or when the operator selects done button 1220), the invalidations can be committed. In some embodiments, a confirmation screen can be presented prior to committing any invalidations. FIG. 14 shows an example of a confirmation screen 1400 according to an embodiment of the present invention. Confirmation screen 1400 can present the base job to be invalidated at box 1402, a list of antecedent jobs to be invalidated at box 1404, and a list of descendant jobs to be invalidated at box 1406. The list of antecedent jobs can include all jobs the operator marked as invalid during analysis (e.g., using screens 1200 and 1300). The list of descendant jobs can include all jobs that are descendants of the base job and all other jobs that are descendants of an antecedent job that is listed in box 1402.

For each category, the operator can select whether to invalidate and reschedule the jobs using checkboxes 1410-1416. In some embodiments, rescheduling can be automatic on invalidation, and a separate option to reschedule need not be provided. When finished reviewing, the operator can select button 1430 to commit the invalidations or button 1440 to cancel. In either case, the interface can return to screen 800 to allow another selection. As noted above, any jobs that were invalidated through the analysis process would cease to appear in anomaly list 804.

In the examples described above, the analysis interface of FIGS. 12 and 13 does not present descendant jobs for review. In some embodiments, the operator can review descendants of the base job or any job invalidated during analysis in a manner similar to that described above. In other embodiments, it can be inferred that if a particular job is invalidated, all of its descendants should be invalidated as well. Accordingly, the list of descendant jobs at box 1406 can include any descendants of the base job and any other descendants of any of the antecedent jobs listed in box 1404.

As described above with reference to FIG. 11, in some embodiments, screen 1400 can present additional information such as the number of jobs to be invalidated or rescheduled and/or the estimated time to execute the rescheduled jobs. In some embodiments, invalidation and rescheduling can be controlled on a per-job basis, rather than per-group. Also, as described above, rescheduling a job can automatically result in rescheduling all descendants of that job.

It will be appreciated that the invalidation interfaces described herein are illustrative and that variations and modifications are possible. Graphical elements can be replaced with other elements, size and position of elements can be varied, elements shown can be omitted, and elements or control options not described herein may be provided. For example, at screen 1400, the operator may be able to select individual jobs to invalidate and/or reschedule rather than making selections at a category level as shown.

Figure 15:
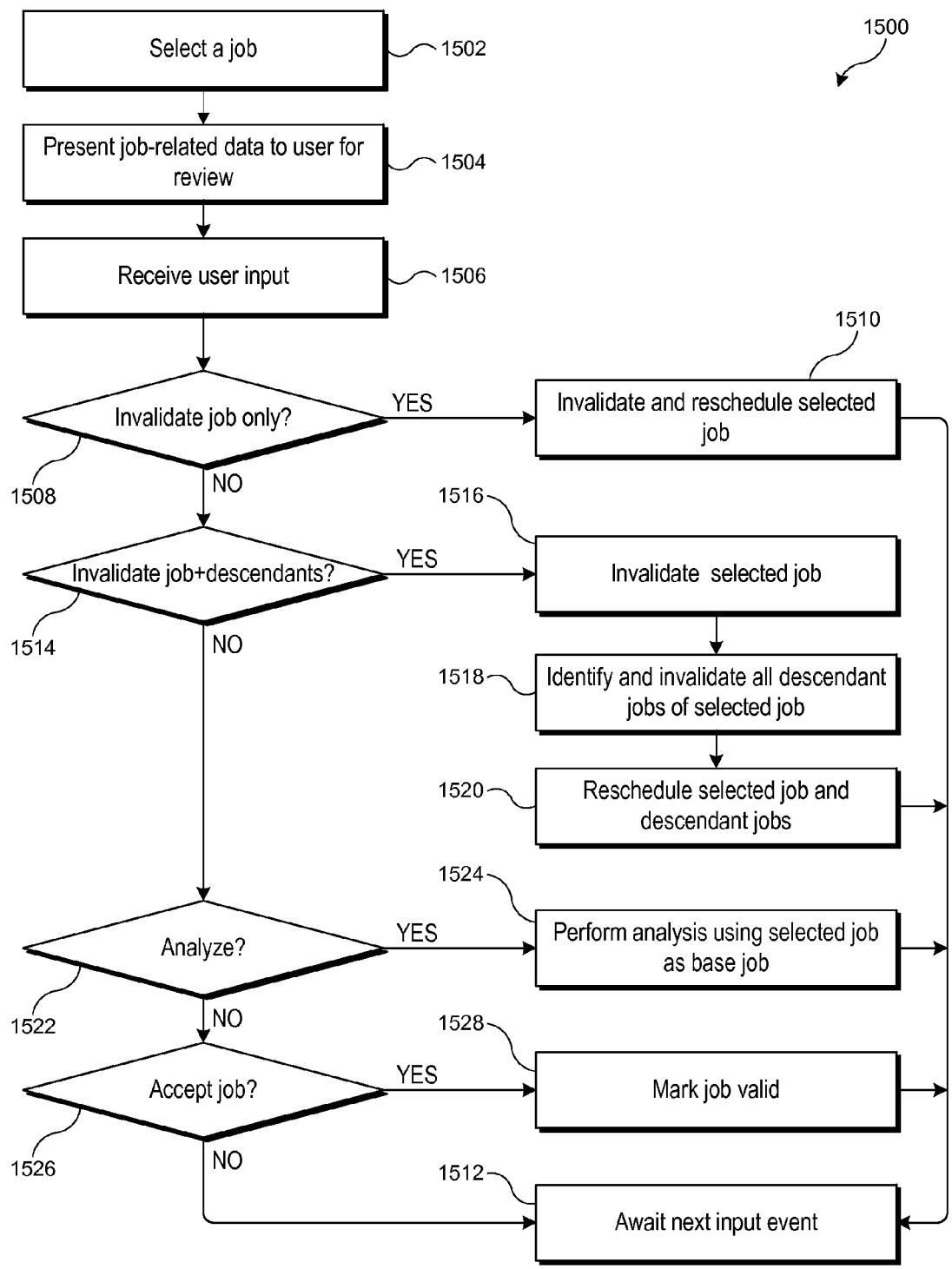
FIG. 15 shows a flow diagram of a process for reviewing and invalidating jobs in an analytics system according to an embodiment of the present invention

FIG. 15 shows a flow diagram of a process 1500 for reviewing and invalidating jobs in an analytics system according to an embodiment of the present invention. Process 1500 can be implemented, e.g., in monitoring interface 306 of FIG. 3, and can present various user interface screens, such as the screens described above with reference to FIGS. 8-14.

Process 1500 can begin at block 1502, with selection of a job for review and possible invalidation. In some embodiments, block 1502 can include presenting an interface screen such as screen 800 of FIG. 8 and receiving user input selecting a job to review. At block 1504, process 1500 can present job-related data to the user for review. The job-related data can include data provided in a job log file (e.g., log file 700 of FIG. 7) and/or other data. In some embodiments, the job-related data can include a graphical representation of data from the job log file and/or a graphical representation of a property of the output data object produced by the job. The data can be presented, e.g., using an interface screen such as screen 900 of FIG. 9.

At block 1506, process 1500 can receive user input. For instance, the user can operate invalidate button 906 or accept button 908 of FIG. 9, and if button 906 is operated, the user can make a selection from menu 1002 of FIG. 10. Based on the user input, process 1500 can perform subsequent actions.

For example, at block 1508, if the user input indicates that only the job selected at block 1502 should be invalidated, then the selected job can be invalidated at block 1510. Invalidating a job can cause any unexecuted descendant jobs that depend on the invalidated job (or its output data object) to be held or paused until the invalid job is rerun; in some embodiments, if an executing sink job detects that its source data object is invalid, the sink job can either terminate with an error or indicate in its log file and/or in the metadata for its output data object that its output data is suspect. (This condition can be a soft failure as described above.) Jobs can be invalidated using various techniques, such as by marking the job log file (e.g., log file 700 of FIG. 7) or other record of completed jobs to indicate that the job has been invalidated and/or by marking an output data object produced by the job as invalid (e.g., by modifying metadata associated with the output data object).

In some embodiments, a job that is invalidated can also be automatically rescheduled at block 1510. In other embodiments, block 1510 can include prompting the user to confirm whether the invalidated job should be rescheduled, with rescheduling occurring if the user confirms. Process 1500 can proceed to block 1512 to wait for the next user input event, e.g., selecting another job to review or exiting the review process.

At block 1514, if the user input indicates that the selected job and its descendants should be invalidated, then at block 1516, process 1500 can invalidate the selected job, similarly to invalidation at block 1510. At block 1518, process 1500 can identify and invalidate all descendant jobs of the selected job that have executed. As at block 1510, any unexecuted descendant jobs may become held or paused as a result of invalidation of an antecedent job. At block 1520, the selected job and its invalidated descendant jobs can be rescheduled. As described above, in some embodiments, rescheduling of invalidated jobs can occur automatically. In other embodiments, the user may be prompted to confirm that the jobs should be rescheduled, and the confirmation can be global across all the descendant jobs or on a per-job basis as desired. Process 1500 can proceed to block 1512 to wait for the next user input event, e.g., selecting another job to review or exiting the review process.

At block 1522, if the user input indicates that analysis is desired (e.g., to find the root of the problematic data), then at block 1524, process 1500 can invoke an analysis process to identify and invalidate sources of invalid data in the selected job. An example of an analysis process is described below. After analysis, process 1500 can proceed to block 1512 to wait for the next user input event, e.g., selecting another job to review or exiting the review process.

At block 1526, if the user input indicates that the job is accepted, then at block 1528, process 1500 can mark the job as valid. In some embodiments, marking a job valid can include, e.g., marking the job log file (e.g., log file 700 of FIG. 7) or other record of completed jobs to indicate that the job has been confirmed as valid and/or by marking an output data object produced by the job as confirmed valid (e.g., by modifying metadata associated with the output data object). In some embodiments, jobs that have been marked as valid can be protected against subsequent invalidation. For example, a subsequent request by an operator to invalidate the job can result in requiring confirmation from another operator (e.g., a higher-level employee). Process 1500 can proceed to block 1512 to wait for the next user input event, e.g., selecting another job to review or exiting the review process.

Figure 16:
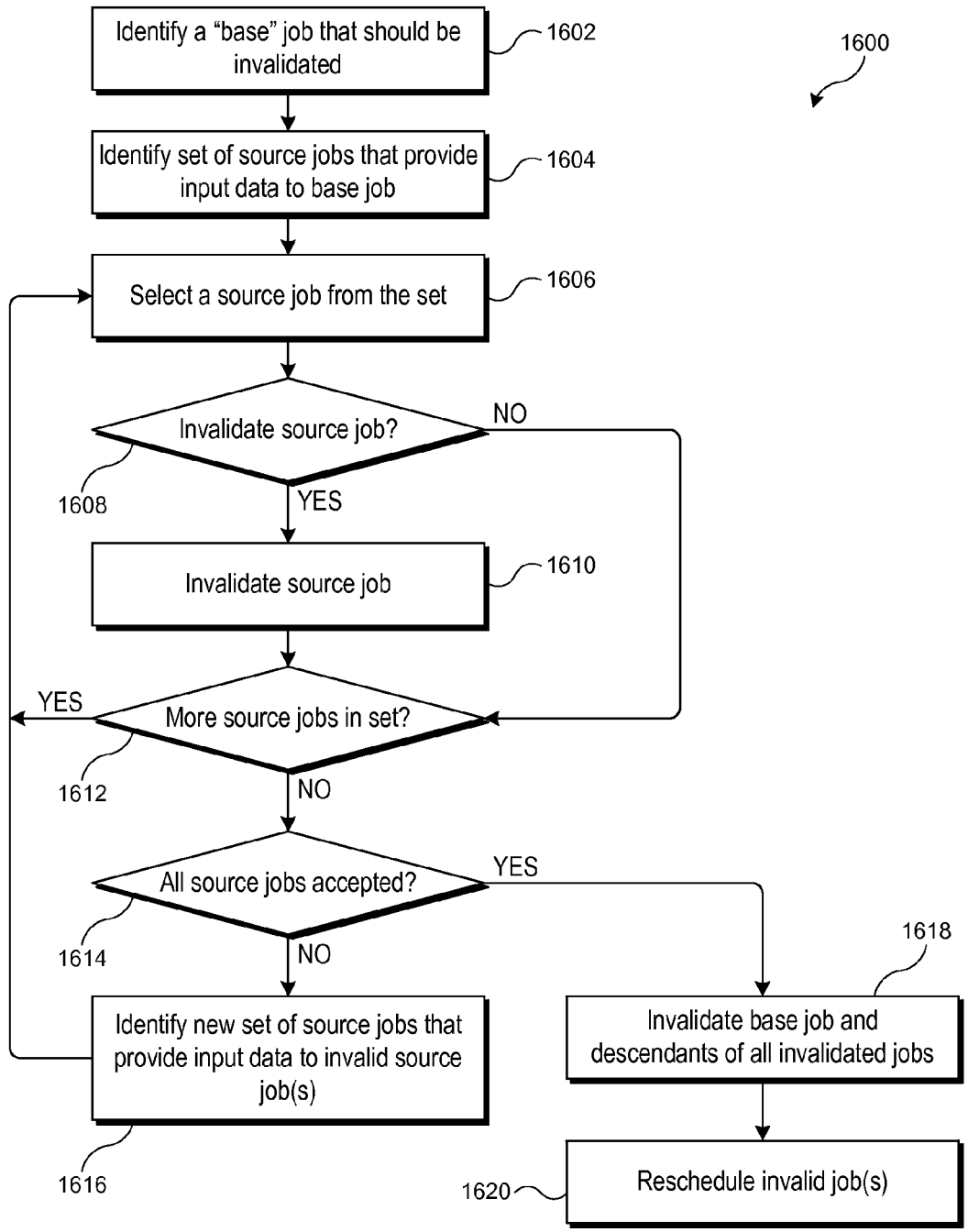
FIG. 16 shows a flow diagram of an analysis process according to an embodiment of the present invention.

FIG. 16 is a flow diagram of an analysis process 1600 that can be implemented, e.g., at block 1524 of process 1500 according to an embodiment of the present invention. Process 1600 allows a user to systematically review antecedent jobs for an invalid base job and determine which of the antecedent jobs should be invalidated.

Process 1600 can begin at block 1602 with identifying a "base" job that should be invalidated. The base job can be identified, e.g., using interface screens 900 and 1000 described above; for instance, when option 1008 is selected in screen 1000, the job currently being reviewed can be identified as the base job and invalidated. Where process 1600 is used to implement block 1524 of process 1500, the job selected at 1502 can become the base job for analysis process 1600 if analyze option 1522 is selected.

At block 1604, process 1600 can identify a set of source jobs that provide the source data objects for the base job. For example, if jobs have job definition files that identify their source and output data objects, block 1604 can include identifying one or more other jobs (source jobs) that produce the source data object(s) consumed by the base job.

Process 1600 can facilitate iterative review of the source jobs. For example, at block 1606, process 1600 can select one of the source jobs from the set to be reviewed. Selection can be based on any desired algorithm (e.g., alphabetical order by name of source job, an order based on execution order of the source jobs, or the like). At block 1608, process 1600 can determine whether the selected source job should be invalidated. For example, as described above, data pertaining to the selected source job can be presented to the user, and the user can indicate whether or not the selected source job should be invalidated. If the source job should be invalidated, then at block 1610, the source job can be invalidated (e.g., as described above). At block 1612, if there are more source jobs in the set of source jobs, process 1600 can return to block 1606 to select a different source job for possible invalidation.

At block 1614, after a decision to invalidate has been made for each source job, process 1600 can determine whether all of the source jobs in the set were accepted. If any of the source jobs were invalidated (i.e., not all source jobs were accepted), then at block 1616, for each invalid source job, process 1600 can identify the source jobs that provided input data objects to the invalid source job, thereby forming a new set of source jobs for analysis. Process 1600 can then return to block 1606 to select each source job from this new set in turn to be reviewed and either invalidated or accepted.

Process 1600 can continue in this manner to define and facilitate review of additional sets of source jobs until a point is reached where, at block 1614, all source jobs in the current set of source jobs are accepted. At block 1618, process 1600 can invalidate the base job and all descendants of the base job, as well as any other descendants of any source jobs that were invalidated at block 1610; this invalidation can be similar to blocks 1516 and 1518 of process 1500 described above. At block 1620, process 1600 can reschedule the invalid jobs, including the base job, each antecedent job that was invalidated at block 1610, and each descendant job that was invalidated at block 1618. As described above, in some embodiments, rescheduling of invalidated jobs can occur automatically. In other embodiments, the user may be prompted to confirm that the jobs should be rescheduled, and the confirmation can be global across all jobs or on a per-job basis or on a per-group-of-jobs-basis (e.g., separate options for antecedent and descendant jobs) as desired.

It will be appreciated that processes 1500 and 1600 are illustrative and that variations and modifications are possible. Steps described as sequential may be executed in parallel, order of steps may be varied, and steps may be modified, combined, added or omitted. For instance, invalidation and rescheduling can occur together or separately. Jobs can be marked invalid in any order. In some embodiments where the jobs to be invalidated include antecedent and descendant jobs, it may be desirable to invalidate the antecedent jobs first, e.g., to avoid initiating execution of a descendant job whose source data is about to be invalidated. The dependency tree leading backward in time from the base job can be traversed in any order, e.g., in order of generations as described above, walking each branch upward in turn, or any other order. In some embodiments, the user may be able to select or control the order, e.g., by selecting jobs of interest from a graphical view of the dependency tree as described above.

Processes 1500 and 1600 can be implemented as interactive processes, in which some or all of the decisions to invalidate or accept various jobs are made by an operator and communicated to the system (e.g., to monitoring interface 306); interface screens such as the examples described above can be used. In some embodiments, some or all of the invalidation decisions can be automated. For example, severe statistical anomalies in a given job's output data object or quality control data may result in automatic invalidation of that job and its descendants. In some embodiments, monitoring interface 306 can present an operator with a proposed list or tree view of jobs to be invalidated based on statistical anomalies; the operator can use processes and interfaces similar to those described above to confirm or modify the proposal.

As described above, data objects and dependencies can be of snapshot or interval types. In the case of jobs that produce snapshot data objects, invalidity in the data object produced by one instance of the job may infect subsequent instances of the same job. For example, as described above, snapshot job 508 can execute on a daily basis to generate a table of all registered users of a service. In some embodiments, snapshot job 508 can execute by copying the previous day's user table 510 and processing a log of updates representing the day's activity (e.g., adding or removing users). If, on a given day (e.g., day D5), snapshot job 508 generates invalid data, the snapshot jobs 508 for the following days (D6, D7, etc.) will carry the invalid data forward. Accordingly, in some embodiments, if one instance of a snapshot job is invalidated, all subsequent instances of that snapshot job can also be invalidated. Identification of the subsequent instances can be automatic, and their invalidation can be automatic or subject to user approval (e.g., via screen 1100 or screen 1400).

In some embodiments, when a sequence of snapshot jobs is invalidated, the operator may have the option to execute a single "cleanup" instance of the snapshot job to obtain current valid data, rather than rerunning each instance of the job to re-create the entire sequence of snapshots. Executing a cleanup instance can include, e.g., reverting to the most recent valid snapshot data object and reprocessing all updates going forward from the date/time of the last valid object in a single job or starting over from the beginning of time (as defined above) to build a new snapshot data object. Whether to re-execute the sequence of snapshot jobs or execute a single cleanup job can depend, e.g., on whether the intermediate snapshots are still of interest.

In some embodiments, certain jobs may depend on data from external sources. For example, referring again to FIG. 5, import activity logs job 512 consumes activity logs 506 maintained by an online service provider. Activity logs 506 can be periodically (e.g., every hour) delivered to analytics system 300, and job 512 can be scheduled to run based on the expected delivery time of activity logs 506. For instance, in one embodiment, new activity logs 506 are produced every hour, ending on the hour, and is expected to be delivered to system 300 in less than 15 minutes. Accordingly, job 512 can be scheduled to start 15 minutes after the hour to process the previous hour's activity logs 506.

In practice, however, delivery of some or all activity logs 506 can occasionally be delayed for various reasons, and an instance of job 512 might begin before a complete set of activity logs 506 has been received. In some embodiments, if it is known in advance how many activity logs 506 to expect, system 300 can suspend or delay execution of job 512 until a complete set of activity logs 506 has been received. In other embodiments, it is not known in advance how many activity logs 506 to expect, and system 300 can simply execute instances job 512 according to a set schedule.

In the case where job 512 executes according to a set schedule, an automatic invalidation can occur if it is later determined that the set of log files 506 processed by job 512 was incomplete. For example, using infrastructure monitoring software such as Nagios® (a product of Nagios Enterprises, LLC) or Ganglia (an open-source project of the Ganglia Project), system 300 can determine the time when activity logs 506 covering a particular period (e.g., one hour) were actually received and compare that to the time when the instance of job 512 covering that period was executed. If the comparison indicates that one or more of activity logs 506 covering a particular period were received after execution of the corresponding instance of job 512, that instance of job 512 can be invalidated, along with any of its descendant jobs. This invalidation process can be partially or fully automated. As with other invalidation processes described herein, invalidated jobs can be automatically rescheduled, or rescheduling can be subject to operator confirmation. A similar quality-control process can be applied to any "import" job that consumes (or processes) data from an external source; if an instance of an import job executed prior to the system receiving the complete set of external data the import job was intended to consume, the import job and its descendants can be invalidated on that basis.

As described above, certain embodiments of the present invention can facilitate determinations as to when job data is invalid and which jobs should be re-executed in response to invalid data. For example, an operator can automatically invalidate a job and all of its descendants without first knowing what the descendant jobs are; the system can automatically identify all such jobs for the operator. As another example, an operator can analyze the source data consumed by a base job that produced invalid data, and the source data consumed by sources of the base job, to trace the root of invalid data; the system can facilitate identification and systematic review of antecedent jobs, without requiring the operator to figure out what the antecedent jobs were. Once a root is found, the system can work forward to identify and invalidate all descendant jobs "infected" by the root invalid data. Such a monitoring system can relieve the operators of the need to figure out a complex dependency tree among a potentially large number of jobs in order to selectively invalidate and/or reschedule jobs. As another example, jobs that import data from external sources can be invalidated based on comparing the time when the job executed to the time when the data from the external source became available.

While the invention has been described with respect to specific embodiments, one skilled in the art will recognize that numerous modifications are possible. For example, the particular jobs, workflows, data tables, other data structures, and computing systems described herein are used for purposes of illustration; other jobs, workflows, data structures, and computing systems can be substituted. Techniques for job definition and/or job scheduling and execution can also be modified as appropriate for a particular implementation.

Further, although the description above makes specific reference to analysis and reporting of user activity related to an online service, those skilled in the art will recognize that similar techniques and concepts can be applied to other analytics systems, including business intelligence systems, data mining systems, and any other type of large-scale automated analysis system that obtains and manipulates large quantities of data, or more generally in any context where performance of a data-consuming task is contingent on completion of a data-producing task.

The dependency examples described above relate to instances where one job produces data that is consumed by another, and it is assumed that execution of the consumer (sink) job should not begin until the producer (source) job has completed. In some embodiments, other models of dependency between source jobs and sink jobs can exist. For example, a source job may be implemented as a streaming job that continually adds new data to a data table, file, stream buffer, or other data object that is read by the sink job. In this case, the sink job need only wait until execution of the source job reaches some milestone or checkpoint within the stream. As another example, the sink job can begin execution while the source job is still producing data, provided that the sink job can keep track of which data it has already processed and can continue processing until notified that the source job is complete (or that the source job will not produce additional data). In some embodiments, different dependency models can coexist, and an analyst defining a job can specify the model to be used for a given sink job.

In some embodiments, jobs can be dynamically redefined, e.g., to exploit available data and avoid reprocessing. For example, if a job is defined to generate an activity table for a specific time interval (e.g., the month of February) and an activity table for a portion of the period (e.g., the first two weeks of February) already exists, the job can be redefined to generate the table for the remaining portion of the period (e.g., the last two weeks in February) and merge the new table with the existing table.

In some embodiments, analysts specify dependencies of jobs on their source data objects, and the analytics system can infer job-to-job dependencies. For purposes of identifying antecedent and/or descendant jobs to invalidate, automatic inference of job-to-job dependencies can be used but is not required. As long as the monitoring module that manages invalidation has access to information about which jobs depend on which other jobs, techniques described herein can be used.

Embodiments described above may make reference to data structures and databases, storage or data stores. It is to be understood that these terms can encompass any techniques for organizing information into discrete records that can be stored, retrieved and interpreted by computer systems. In some embodiments, a distributed computing system can be organized such that it appears to external entities as a single data store that can receive queries (e.g., SQL-like queries). Similarly, techniques that have been described with reference to data tables can be modified to use other data structures, including relational or non-relational data structures and/or databases, arrays, linked lists, or the like.

Job invalidation, or aspects thereof, can be performed by operators, which can include any person with access to the analytics system (and appropriate privileges). In some embodiments, any operator can invalidate any job. In other embodiments, the job-invalidation process can include review and approval by other operators and/or by automated processes, e.g., depending on the amount of data to be invalidated and/or the resources required to re-process the invalid jobs. Such review and approval can occur before any jobs are actually invalidated. For example, in response to receiving an invalidation instruction from one operator, a monitoring and invalidation system can alert another operator and proceed only if the other operator confirms.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   at one or more computing devices comprising one or more processors and one or more storage media storing one or more computer programs executed by the one or more processors to perform the method, performing operations comprising:
   receiving, via a graphical user interface, an input identifying a base job to be invalidated, the base job having been executed to completion or failure, wherein execution of the base job produced at least one output data object;
   in response to receiving the input, identifying a set of antecedent jobs of the base job, each of the antecedent jobs in the identified set of antecedent jobs having been executed to completion or failure, wherein each of the antecedent jobs in the set produced at least one output data object that was consumed directly or indirectly by the base job;
   identifying a subset of the set of antecedent jobs for invalidation;
   invalidating the base job and the subset of the antecedent jobs;
   wherein invalidating the base job comprises storing, for the base job, job execution indicia specifying that the at least one output data object produced by the base job is invalid; and
   wherein invalidating the subset of the antecedent jobs comprises storing, for each antecedent job in the subset, job execution indicia specifying that the at least one output data object produced by the each antecedent job is invalid.

2. The method of claim 1 further comprising:
   presenting, by a monitoring interface, quality-control information about the base job to the user,
   wherein receiving the input includes receiving a user input responsive to presenting the quality-control information about the base job.

3. The method of claim 1 wherein identifying the set of antecedent jobs for the base job includes:
   identifying a first source data object that is consumed directly by the base job; and
   identifying, as one of the antecedent jobs, a first source job that produced the first source data object.

4. The method of claim 3 wherein identifying the set of antecedent jobs for the base job further includes:
   identifying a second source data object that is consumed directly by the first source job; and
   identifying, as another one of the antecedent jobs, a second source job that produced the second source data object.

5. The method of claim 1 wherein the set of antecedent jobs includes every job executed to completion or failure that produced a data object that was consumed directly or indirectly by the base job.

6. The method of claim 1 wherein identifying the subset of antecedent jobs for invalidation includes:
   presenting, by a monitoring interface, quality-control information about one of the antecedent jobs from the set of antecedent jobs to the user; and
   receiving, in response to the presentation, a user input indicating whether the presented antecedent job should be invalidated.

7. A computer system comprising:
   one or more processing units; and
   one or more storage media storing instructions for execution by the one or more processing units and configured for:
   identifying a base job to be invalidated, the base job having been executed to completion or failure, wherein execution of the base job produced at least one output data object;
   identifying a set of antecedent jobs, each of the antecedent jobs in the identified set of antecedents jobs having been executed to completion or failure, wherein each of the antecedent jobs in the set of antecedent jobs produced at least one output data object that was consumed directly or indirectly by the base job;
   identifying a subset of the set of antecedent jobs to be invalidated;
   identifying a set of descendant jobs to be invalidated, each of the descendant jobs in the identified set of descendant jobs having been executed to completion or failure, wherein each job in the set of descendant jobs directly or indirectly consumed the at least one output data object that was produced by the base job, wherein each job in the set of descendant jobs produced at least one output data object based on the at least one output data object produced by the base job that the each descendant job directly or indirectly consumed;

invalidating the base job by storing job execution indicia specifying that the at least one output data object produced by the base job is invalid; and invalidating one or more additional jobs selected from the subset of the antecedent jobs and the set of descendant jobs by storing, for each additional job of the one or more additional jobs, job execution indicia specifying that the at least one output data object produced by the each additional job is invalid.

8. The computer system of claim 7 wherein the instructions further comprise instructions for:

presenting at a user interface, prior to invalidating the base job and the one or more additional jobs, a list of proposed jobs to invalidate, the list including the base job, the subset of the antecedent jobs, and the set of descendant jobs; and receiving, via the user interface, an instruction indicating which of the jobs on the list of proposed jobs to invalidate should be invalidated.

9. The computer system of claim 7 wherein the instructions further comprise instructions for:

determining whether the one or more invalidated jobs should be rescheduled; and rescheduling the invalidated jobs in response to determining that the invalidated jobs should be rescheduled.

10. The computer system of claim 9 wherein the instructions further comprise instructions for determining whether the one or more invalidated jobs should be rescheduled based on user input.

11. The computer system of claim 7 wherein invalidating the one or more additional jobs includes invalidating all of the jobs in the set of descendant jobs.

12. The computer system of claim 7 wherein invalidating the one or more additional jobs includes invalidating all of the jobs in the subset of the antecedent jobs.

13. The computer system of claim 7 wherein the instructions further comprise instructions for:

analyzing quality-control data for a plurality of executed jobs to identify one or more suspect jobs whose output data is suspect according to a quality-control metric;

presenting, at a user interface, a listing of the suspect jobs;

receiving, via the user interface, a first user input selecting one of the suspect jobs;

presenting, at the user interface, a representation of the quality-control data for the selected suspect job; and receiving, via the user interface, a second user input indicating whether the selected suspect job should be invalidated, wherein the selected suspect job is identified as the base job in response to the second user input.

14. The computer system of claim 7 wherein the instructions further comprise instructions for:

identifying an import job that consumed data from an external source;

determining a delivery time at which the data from the external source was delivered;

determining an execution time at which the import job was executed; and in the event that the delivery time is later than the execution time:

invalidating the import job; and invalidating one or more descendant jobs of the import job, wherein each descendant job of the import job directly or indirectly consumed an output data object that was produced by the import job.

15. A non-transitory computer-readable medium having stored thereon executable instructions that, when executed by one or more processors of a computer system, cause the computer system to execute a method comprising:

identifying a base job to be invalidated, the base job having been executed to completion or failure, wherein execution of the base job produced at least one output data object;

identifying a set of antecedent jobs of the base job, each of the antecedent jobs in the identified set of antecedent jobs having been executed to completion or failure, wherein each of the antecedent jobs in the set produced at least one output data object that was consumed directly or indirectly by the base job;

identifying a subset of the set of antecedent jobs for invalidation;

invalidating the base job and the subset of the antecedent jobs;

wherein invalidating the base job comprises storing, for the base job, job execution indicia specifying that the at least one output data object produced by the base job is invalid; and wherein invalidating the subset of the antecedent jobs comprises storing, for each antecedent job in the subset, job execution indicia specifying that the at least one output data object produced by the each antecedent job is invalid.

16. The non-transitory computer-readable medium of claim 15 wherein identifying a subset of the set of antecedent jobs for invalidation includes:

sequentially presenting, at a user interface, a representation of quality-control data for different jobs in the set of antecedent jobs;

receiving, in response to each presentation, a user input indicating whether the job for which quality-control data is currently presented should be invalidated; and adding the job whose data is currently presented to the subset of the set of antecedent jobs in the event that the user input indicates that the job for which quality-control data is currently presented should be invalidated.

17. The non-transitory computer-readable medium of claim 15 wherein the method further comprises:

identifying a set of descendant jobs, wherein each of the jobs in the set of descendant jobs directly or indirectly consumed data that was produced by the base job or by one of the jobs in the subset of the set of antecedent jobs; and invalidating the set of descendant jobs.

18. The non-transitory computer-readable medium of claim 15 wherein identifying a subset of the set of antecedent jobs for invalidation includes:

presenting, at a user interface, a view showing the base job and a set of one or more direct source jobs, wherein each of the direct source jobs produced a data object that was directly consumed by the base job;

presenting, at the user interface, a representation of quality-control data for one of the direct source jobs; and receiving, via the user interface, a first user input indicating whether the one of the direct source jobs is to be invalidated, wherein the one of the direct source jobs is added to the subset of the set of antecedent jobs if the second user input indicates that the one of the direct source jobs is to be invalidated.

19. The non-transitory computer-readable medium of claim 18 wherein identifying a subset of the set of antecedent jobs for invalidation further includes, in the event that the one of the direct source jobs is added to the subset of the set of antecedent jobs:
presenting, at the user interface, a modified view showing the base job, the set of one or more direct source jobs, and a set of one or more indirect source jobs, wherein each of the indirect source jobs produced a data object that was directly consumed by the one of the direct source jobs;
presenting, at the user interface, a representation of quality-control data for one of the indirect source jobs; and
receiving, via the user interface, a second user input indicating whether the one of the indirect source jobs is to be invalidated, wherein the one of the indirect source jobs is added to the subset of the set of antecedent jobs if the second user input indicates that the one of the indirect source jobs is to be invalidated.

20. A method comprising:
at one or more computing devices comprising one or more processors and one or more storage media storing one or more computer programs executed by the one or more processors to perform the method, performing operations comprising:
receiving, via a user interface, a first input identifying a base job to be invalidated, the base job having been executed to completion or failure, wherein execution of the base job produced at least one output data object;
in response to receiving the first input, identifying a set of descendant jobs of the base job, each of the descendant jobs in the identified set of descendant jobs having been executed to completion or failure, wherein each of the descendant jobs in the set directly or indirectly consumed the at least one output data object that was produced by the base job, wherein each job in the set of descendant jobs produced at least one output data object based on the at least one output data object produced by the base job that the each descendant job directly or indirectly consumed;
receiving a second input indicating whether the descendant jobs should be invalidated;
invalidating the base job including storing, for the base job, job execution indicia specifying that the at least one output data object produced by the base job is invalid; and
in the event that the second input indicates that the descendant jobs should be invalidated, invalidating the set of descendant jobs including storing, for each descendant job in the set, job execution indicia specifying that the at least one output data object produced by the each descendant job is invalid.

21. The computer-implemented method of claim 20 wherein the second input further indicates that the base job should be analyzed, the method further comprising:
identifying, by a monitoring interface, a set of antecedent jobs for the base job, wherein each of the antecedent jobs in the set produced data that was consumed directly or indirectly by the base job;
identifying, by the monitoring interface, a subset of the set of antecedent jobs for invalidation; and
invalidating, by the monitoring interface, the subset of the antecedent jobs.

22. The computer-implemented method of claim 20 wherein identifying the set of descendant jobs includes presenting, at a user interface, a listing of the jobs in the set of descendant jobs and wherein the second input is received in response to presenting the listing.

23. A computer system comprising:
one or more processing units; and
one or more storage media storing instructions for execution by the one or more processing units and configured for:
identifying a base job to be invalidated, the base job having been executed to completion or failure and having produced an anomalous output data object;
invalidating the base job by storing, for the base job, job execution indicia specifying that the anomalous output data object is invalid;
identifying a set of descendant jobs of the base job, each of the descendant jobs in the identified set of descendant jobs having been executed to completion or failure, wherein each of the descendant jobs in the set directly or indirectly consumed the anomalous output data object that was produced by the base job, wherein each job in the set of descendant jobs produced at least one output data object based on the anomalous output data object produced by the base job that the each descendant job directly or indirectly consumed;
determining whether the descendant jobs should be invalidated; and
in response to determining that the descendant jobs should be invalidated, invalidating the set of descendant jobs by storing, for each descendant job in the set, job execution indicia specifying that the at least one output data object produced by the each descendant job is invalid.

24. The computer system of claim 23 wherein the identifying a base job to be invalidated includes:
presenting, at a user interface, a representation of quality-control data for a candidate job; and
receiving, via the user interface, a first user input indicating whether the candidate job should be invalidated, wherein the candidate job is identified as the base job in the event that the user input indicates that the candidate job should be invalidated.

25. The computer system of claim 24 wherein the instructions further comprise instructions for selecting the candidate job in response to a second user input.

26. The computer system of claim 24 wherein the instructions further comprise instructions for:
analyzing the quality control data for a plurality of jobs to detect a statistical anomaly; and
selecting the candidate job based on the analysis.

* * * * *